US012762415B2

(12) United States Patent
Lee et al.

(10) Patent No.: US 12,762,415 B2
(45) Date of Patent: Oct. 13, 2026

(54) METHOD FOR EVALUATING PERFORMANCE AND SYSTEM THEREOF

(71) Applicant: SAMSUNG SDS CO., LTD., Seoul (KR)

(72) Inventors: Joon Ho Lee, Seoul (KR); Han Kyu Moon, Seoul (KR); Jae Oh Woo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 661 days.

(21) Appl. No.: 18/213,478

(22) Filed: Jun. 23, 2023

(65) Prior Publication Data

US 2024/0086712 A1 Mar. 14, 2024

(30) Foreign Application Priority Data

Sep. 13, 2022 (KR) ........................ 10-2022-0114771

(51) Int. Cl.
*G06N 3/088* (2023.01)
*G06N 3/094* (2023.01)

(52) U.S. Cl.
CPC ............. *G06N 3/088* (2013.01); *G06N 3/094* (2023.01)

(58) Field of Classification Search
CPC ............................... G06N 3/094; G06N 3/088
See application file for complete search history.

(56) References Cited

U.S. PATENT DOCUMENTS

| | | | | |
|---|---|---|---|---|
| 7,987,144 | B1 * | 7/2011 | Drissi | G06F 18/24 706/45 |
| 11,842,517 | B2 * | 12/2023 | Lyons | G06N 3/045 |
| 2020/0125982 | A1 * | 4/2020 | Gabourie | G06N 20/00 |
| 2020/0151613 | A1 * | 5/2020 | Yoo | G06F 11/3466 |
| 2020/0202257 | A1 * | 6/2020 | Lee | G06V 10/7784 |
| 2020/0401929 | A1 * | 12/2020 | Duerig | G06N 20/00 |
| 2021/0019629 | A1 | 1/2021 | Chidlovskii | |
| 2021/0089883 | A1 * | 3/2021 | Li | G06N 3/08 |
| 2021/0192335 | A1 * | 6/2021 | Das | G06N 20/00 |
| 2022/0083840 | A1 * | 3/2022 | Luong | G06N 20/00 |
| 2022/0092354 | A1 * | 3/2022 | Kunde | G06F 18/213 |
| 2022/0108134 | A1 | 4/2022 | Marrero et al. | |
| 2022/0180200 | A1 * | 6/2022 | Yu | G06N 3/088 |

(Continued)

FOREIGN PATENT DOCUMENTS

| | | | |
|---|---|---|---|
| JP | 2022-73988 | A | 5/2022 |
| KR | 10-2039138 | B1 | 10/2019 |

(Continued)

OTHER PUBLICATIONS

Wang et al., "Data Augmentation with norm-VAE for Unsupervised Domain Adaptation," folarXiv:2012.00848v1 [cs.CV], 2020, Total 12 pages.

*Primary Examiner* — David E Choi
(74) *Attorney, Agent, or Firm* — Sughrue Mion, PLLC

(57) ABSTRACT

Provided are a method for evaluating performance and a system thereof. The method according to some embodiments may include obtaining a first model trained using a labeled dataset, obtaining a second model built by performing unsupervised domain adaptation on the first model, generating pseudo labels for an evaluation dataset using the second model, wherein the evaluation dataset is an unlabeled dataset, and evaluating performance of the first model using the pseudo labels.

13 Claims, 19 Drawing Sheets

(56) References Cited

U.S. PATENT DOCUMENTS

| | | | | |
|---|---|---|---|---|
| 2022/0215958 | A1* | 7/2022 | Kong | G16H 50/20 |
| 2022/0229721 | A1* | 7/2022 | Rossi | G06F 17/16 |
| 2023/0010651 | A1* | 1/2023 | Zhang | B25J 9/1694 |
| 2023/0118614 | A1* | 4/2023 | Huang | G06N 3/0464 706/25 |
| 2023/0359900 | A1* | 11/2023 | Li | G06V 10/759 |
| 2023/0394387 | A1* | 12/2023 | Jia | G06N 20/20 |
| 2024/0177460 | A1* | 5/2024 | Bai | G06V 10/776 |
| 2024/0221346 | A1* | 7/2024 | Wang | G06V 10/762 |
| 2024/0221946 | A1* | 7/2024 | Shin | G16H 50/20 |
| 2024/0273870 | A1* | 8/2024 | Luu | G06V 10/771 |
| 2024/0312197 | A1* | 9/2024 | Chiu | G06V 10/7753 |
| 2025/0063060 | A1* | 2/2025 | Menghani | G06F 21/14 |
| 2025/0156750 | A1* | 5/2025 | Sengupta | G06N 7/01 |
| 2025/0232009 | A1* | 7/2025 | Saha | G06F 18/2415 |
| 2025/0285418 | A1* | 9/2025 | Shang | G06V 10/776 |

FOREIGN PATENT DOCUMENTS

| | | | |
|---|---|---|---|
| KR | 10-2021-0027590 | A | 3/2021 |
| KR | 10-2021-0051343 | A | 5/2021 |

* cited by examiner

METHOD FOR EVALUATING PERFORMANCE AND SYSTEM THEREOF

CROSS-REFERENCE TO RELATED APPLICATION

This application claims priority from Korean Patent Application No. 10-2022-0114771, filed on Sep. 13, 2022, in the Korean Intellectual Property Office, the disclosure of which is incorporated herein in its entirety by reference.

BACKGROUND

1. Field

The present disclosure relates to a method for evaluating performance and a system thereof, and more particularly, to a method of evaluating the performance of a model using an unlabeled dataset and a system for performing the method.

2. Description of the Related Art

Performance evaluation of a model (e.g., a deep learning model) is generally performed using a labeled dataset. For example, model developers divide labeled datasets into a training dataset and an evaluation (or test) dataset and evaluate the performance of a model using the evaluation dataset that has not been used for model training.

However, since the evaluation dataset does not accurately reflect the distribution of a dataset generated in a real environment, it is not easy to accurately evaluate (measure) the actual performance of the model (i.e., the performance when deployed in the real environment). In addition, even if a labeled dataset in the real environment is prepared as the evaluation dataset, the distribution of the dataset generated in the real environment gradually changes over time. Therefore, in order to accurately evaluate the performance of the model, the evaluation dataset must be continuously updated (e.g., the evaluation dataset must be prepared again by performing labeling on the latest dataset), which requires considerable time and human costs.

SUMMARY

Aspects of the present disclosure provide a method of accurately evaluating the performance of a model (e.g., the performance when deployed in a real environment) using an unlabeled dataset (e.g., a dataset in the real environment) and a system for performing the method.

Aspects of the present disclosure also provide a method of accurately evaluating the performance of a model without using a labeled dataset used for model training and a system for performing the method.

Aspects of the present disclosure also provide a method of accurately generating pseudo labels of an unlabeled dataset and a system for performing the method.

Aspects of the present disclosure also provide a method of accurately adapting a model trained in a source domain to a target domain using an unlabeled dataset of the target domain and a system for performing the method.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a method for evaluating performance, the method being performed by at least one computing device. The method may include: obtaining a first model trained using a labeled dataset; obtaining a second model built by performing unsupervised domain adaptation on the first model; generating pseudo labels for an evaluation dataset using the second model, wherein the evaluation dataset is an unlabeled dataset; and evaluating performance of the first model using the pseudo labels.

In some embodiments, the unsupervised domain adaptation and the generating of the pseudo labels may be performed without using the labeled dataset.

In some embodiments, the generating of the pseudo labels may include deriving adversarial noise for a data sample belonging to the evaluation dataset, generating a noisy sample by reflecting the derived adversarial noise in the data sample, and generating a pseudo label for the data sample based on a predicted label of the noisy sample obtained through the second model.

In some embodiments, the evaluating of the performance of the first model may include predicting labels of the evaluation dataset through the first model, and evaluating the performance of the first model by comparing the pseudo labels and the predicted labels.

In some embodiments, the labeled dataset may be a dataset of a source domain, the evaluation dataset may be a dataset of a target domain, and the method may further include obtaining a third model trained using a labeled dataset of the source domain, evaluating performance of the third model using the pseudo labels, and selecting a model to be applied to the target domain from among the first model and the third model based on results of evaluating the performance of the first model and evaluating the performance of the third model.

In some embodiments, the labeled dataset may be a dataset of a first source domain, the evaluation dataset may be a dataset of a target domain, and the method may further include obtaining a third model trained using a labeled dataset of a second source domain, evaluating performance of the third model using the pseudo labels, and selecting a model to be applied to the target domain from among the first model and the third model based on results of evaluating the performance of the first model and evaluating the performance of the third model.

In some embodiments, the evaluation dataset may be a more recently generated dataset than the labeled dataset, and the method may further include determining that the first model needs to be updated in response to a determination that the evaluated performance does not satisfy a predetermined condition.

According to another aspect of the present disclosure, there is provided a system for evaluating performance. The system may include one or more processors, and a memory configured to store one or more instructions; and one or more processors configured to execute the stored one or more instructions to: obtaining a first model trained using a labeled dataset; obtaining a second model built by performing unsupervised domain adaptation on the first model; generating pseudo labels for an evaluation dataset using the second model, wherein the evaluation dataset is an unlabeled dataset; and evaluating performance of the first model using the pseudo labels.

According to yet another aspect of the present disclosure, there is provided a non-transitory computer-readable recording medium storing computer program executable by at least one processor to perform: obtaining a first model trained using a labeled dataset; obtaining a second model built by performing unsupervised domain adaptation on the first model; generating pseudo labels for an evaluation dataset using the second model, wherein the evaluation dataset is an unlabeled dataset; and evaluating performance of the first model using the pseudo labels.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
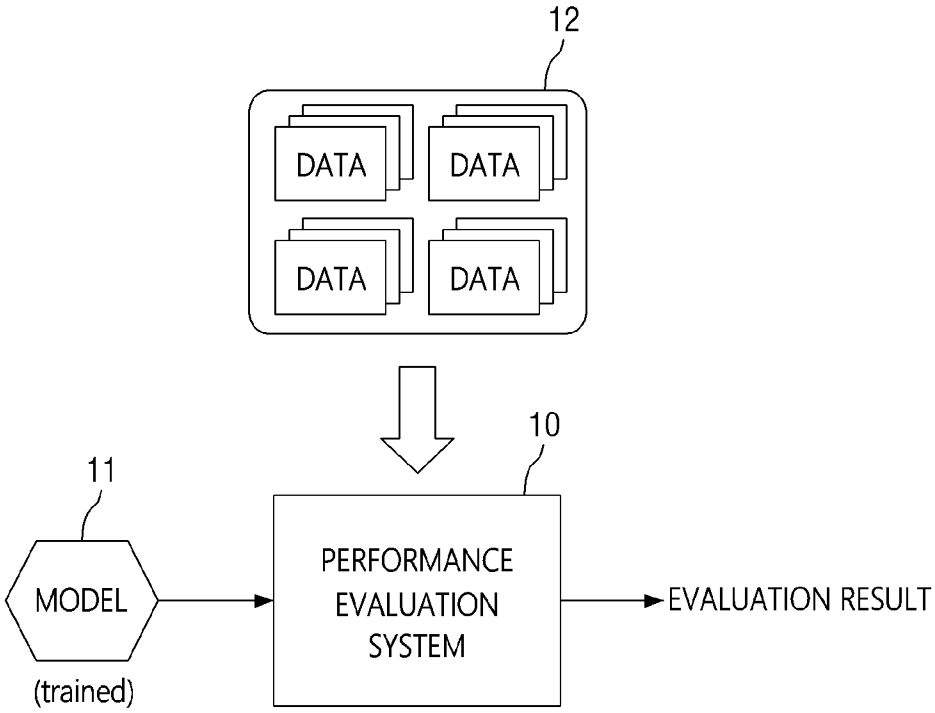
FIGS. 1 through 3 are example diagrams schematically illustrating a performance evaluation system and its operating environment according to embodiments of the present disclosure.

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims and their equivalents.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that may be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), may be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, various embodiments of the present disclosure will be described in detail with reference to the accompanying drawings.

FIG. 1 is an example diagram schematically illustrating a performance evaluation system 10 and its operating environment according to embodiments of the present disclosure.

As illustrated in FIG. 1, the performance evaluation system 10 may be a system that may evaluate the performance of a model 11 using an unlabeled dataset 12. That is, the performance evaluation system 10 may evaluate the performance of the model 11 by using the unlabeled dataset 12 as an evaluation dataset. Here, the model 11 may be a model trained using a labeled dataset (i.e., supervised learning). For ease of description, the performance evaluation system 10 will hereinafter be abbreviated to an 'evaluation system 10'.

More specifically, the evaluation system 10 may build a temporary model for generating pseudo labels of the evaluation dataset 12 by performing unsupervised domain adaptation on the given model 11. Then, the evaluation system 10 may generate the pseudo labels of the evaluation dataset 12 using the built temporary model and evaluate the performance of the model 11 using the generated pseudo labels. In so doing, the performance of the model 11 may be accurately evaluated even in an environment in which there are few labeled datasets or in an environment in which access to labeled datasets used for model training is restricted. For example, the actual performance of the model 11 (i.e., the performance when deployed in a real environment) may be accurately evaluated using an unlabeled dataset in the real environment (or domain), to which the model 11 is to be applied, as the evaluation dataset 12. A specific method of evaluating the performance of the given model 11 using the evaluation system 10 will be described in more detail later with reference to FIG. 4 and subsequent drawings.

For reference, 'unsupervised domain adaptation' refers to a technique for performing domain adaptation using an unlabeled dataset. The concept and execution method of unsupervised domain adaptation will be already familiar to those skilled in the art, and thus a detailed description thereof will be omitted. Some examples of the unsupervised domain adaptation method will be described later with reference to FIGS. 12 through 18.

Figure 2:
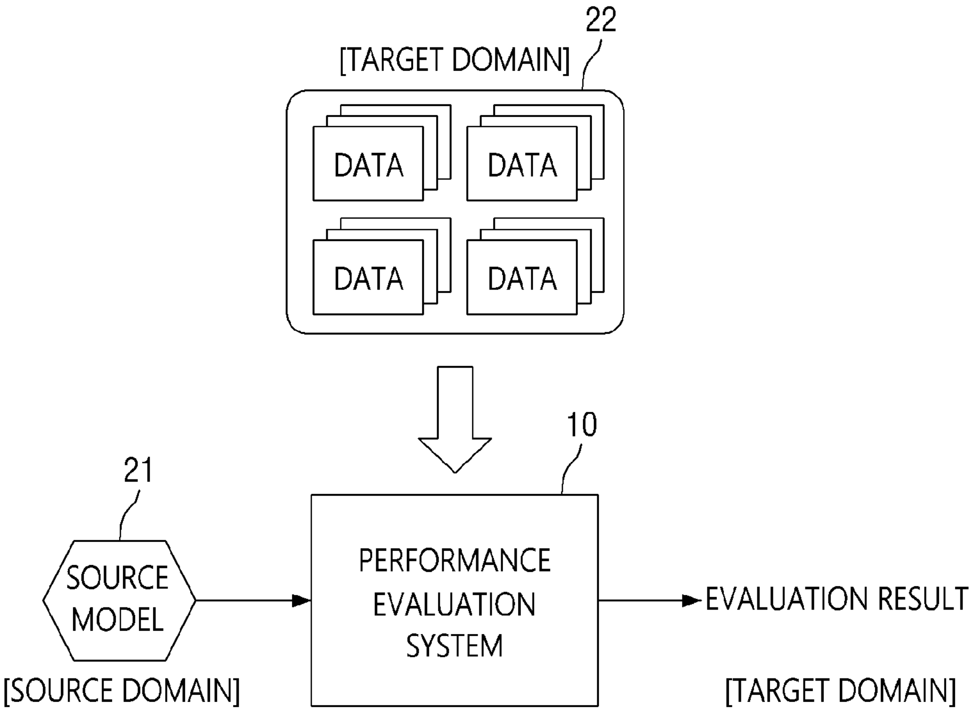

In addition, as illustrated in FIG. 2, the evaluation system 10 may evaluate the performance of a source model 21 (i.e., the performance of the source model for a target domain) using an unlabeled dataset 22 (hereinafter, referred to as a 'target dataset') of the target domain. Here, the source model 21 may refer to a model trained using a labeled dataset (hereinafter, referred to as a 'source dataset') of a source domain.

Figure 3:
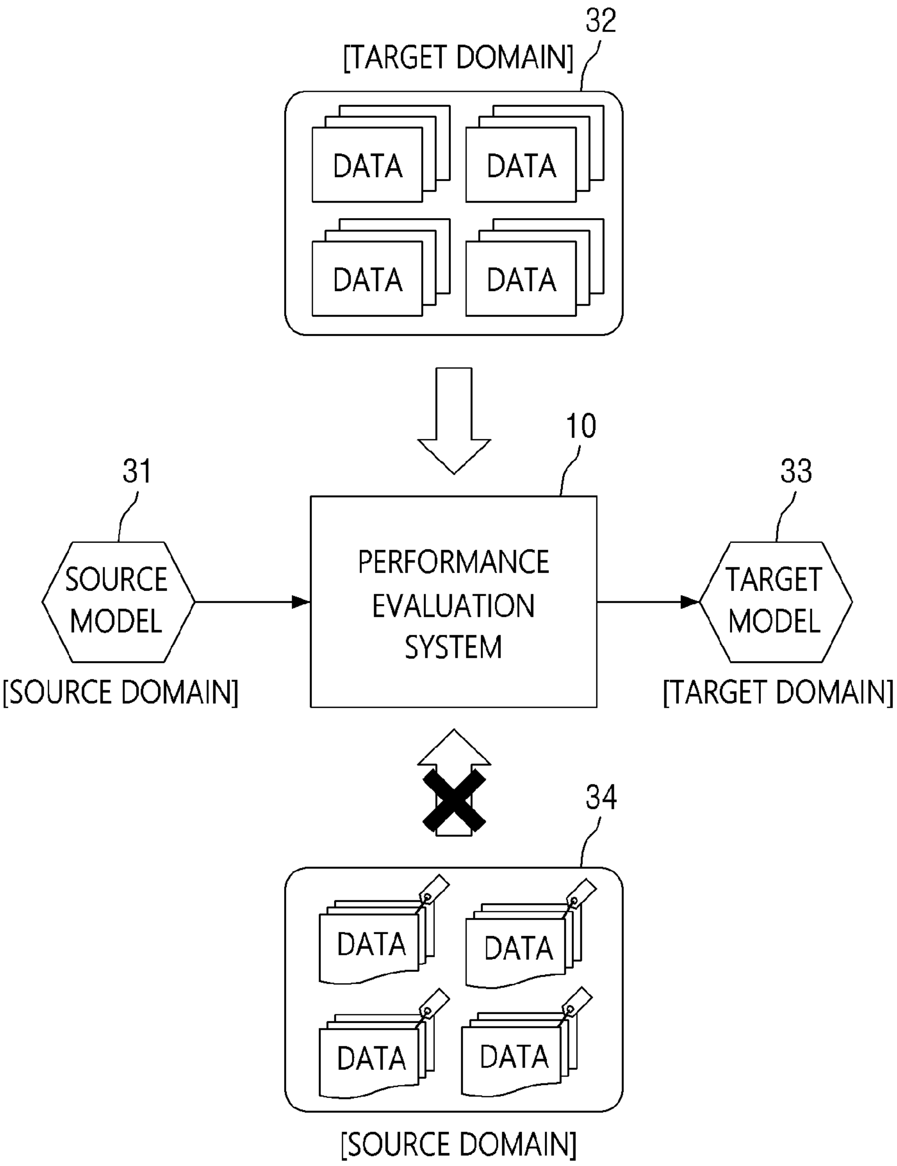

In addition, as illustrated in FIG. 3, the evaluation system 10 may build a target model 33 by performing unsupervised domain adaptation on a source model 31 using a target dataset 32. Here, the target model 33 may refer to a source model adapted (tuned) to suit the target domain. The target model 33 may be built for actual use in the target domain or, as described above, may be built temporarily to generate pseudo labels of an evaluation dataset (e.g., 12 or 22). As illustrated, the evaluation system 10 may build the target model 33 using only the target dataset 32 (i.e., in a 'source-free' manner) without using a source dataset 34. This will be described later with reference to FIGS. 12 through 18.

The evaluation system 10 may be implemented in at least one computing device. For example, all functions of the evaluation system 10 may be implemented in one computing device, or a first function of the evaluation system 10 may be implemented in a first computing device, and a second function may be implemented in a second computing device. Alternatively, a certain function of the evaluation system 10 may be implemented in a plurality of computing devices.

Figure 20:
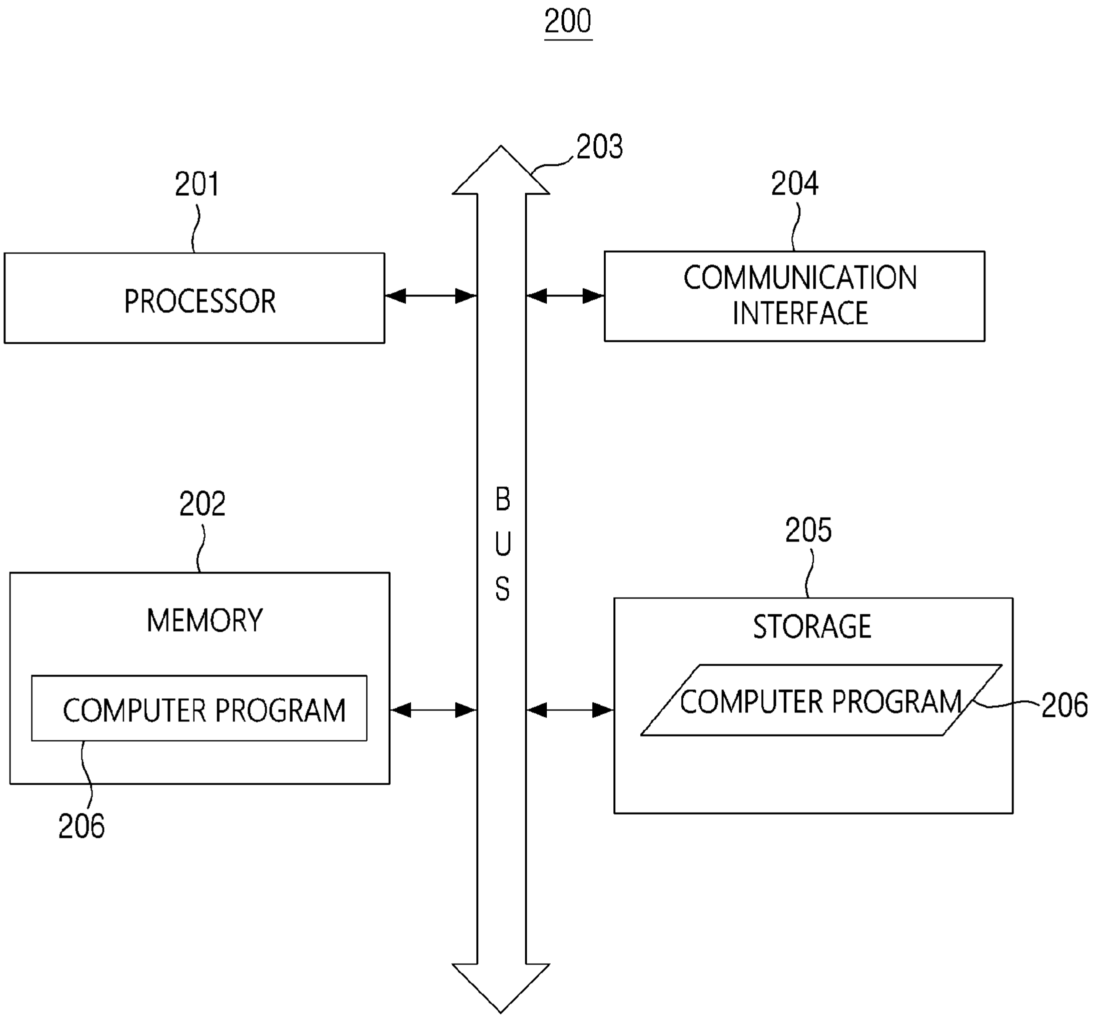
FIG. 20 illustrates an example computing device that may implement the performance evaluation system according to the embodiments of the present disclosure.

A computing device may be any device having a computing function, and an example of this device is illustrated in FIG. 20. Since the computing device is a collection of various components (e.g., a memory, a processor, etc.) interacting with each other, it may be named a 'computing system' in some cases. In addition, the computing system may also refer to a collection of a plurality of computing devices interacting with each other.

Until now, the evaluation system 10 and its operating environment according to the embodiments of the present disclosure have been roughly described with reference to FIGS. 1 through 3. Hereinafter, various methods that may be performed by the above-described evaluation system 10 will be described with reference to FIG. 4 and subsequent drawings.

For ease of understanding, the description will be continued based on the assumption that all steps/operations of the methods to be described later are performed by the above-described evaluation system 10. Therefore, when the subject of a specific step/operation is omitted, it may be understood that the step/operation is performed by the evaluation system 10. However, in a real environment, some steps of the methods to be described later may also be performed by another computing device. For example, unsupervised domain adaptation on a given model (e.g., 11 in FIG. 1) may also be performed by another computing device.

Figure 4:
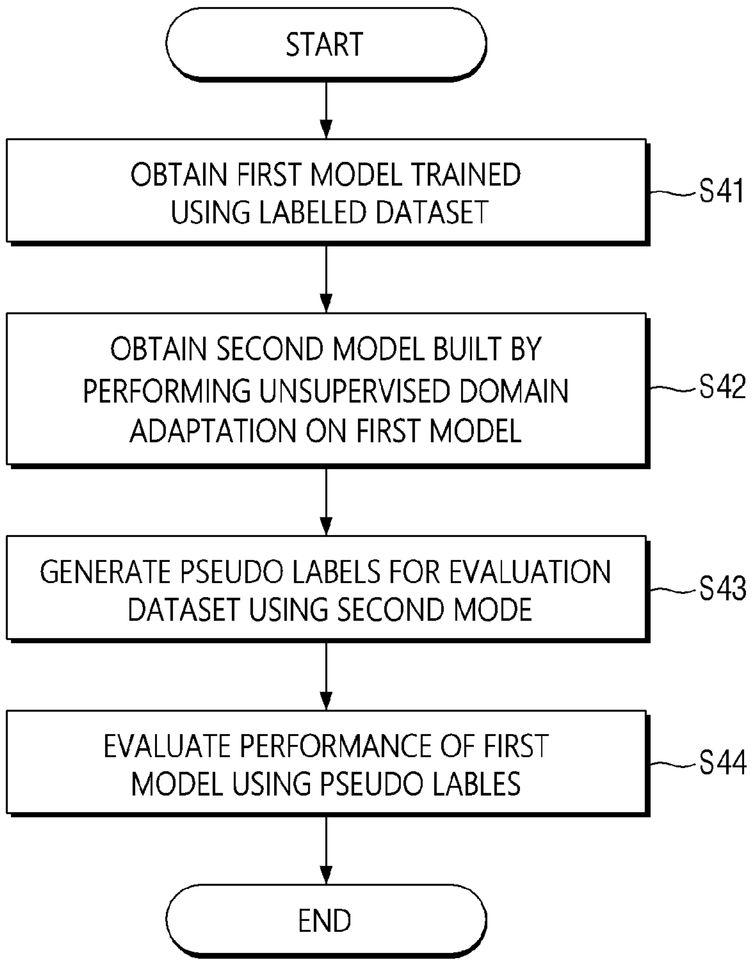
FIG. 4 is an example flowchart illustrating a performance evaluation method according to embodiments of the present disclosure.

FIG. 4 is an example flowchart schematically illustrating a performance evaluation method according to embodiments of the present disclosure. However, this is only an exemplary embodiment for achieving the objectives of the present disclosure, and some operations may be added or deleted as needed.

As illustrated in FIG. 4, the method according to the embodiments may start with operation S41 in which a first model trained using a labeled dataset (i.e., a training dataset) is obtained. Here, the first model may refer to a model to be evaluated. In addition, the first model may be, for example, a model (e.g., the source model 21 of FIG. 2) trained using a source dataset (e.g., in a case where the performance of a source model for a target domain is to be evaluated) or may be a model trained using a labeled dataset of the same domain as an evaluation dataset (e.g., in a case where the actual performance of a model is to be evaluated using a dataset of a real environment or in a case where the performance of a model built in the past is to be evaluated using a current/recent dataset).

In operation S42, a second model built by performing unsupervised domain adaptation on the first model may be obtained. Here, the second model may refer to a temporary model built to generate pseudo labels for an evaluation dataset. For example, the evaluation system 10 may build the second model by performing domain adaptation (e.g., additional learning) on the first model using an evaluation dataset or an unlabeled dataset of the same domain as the evaluation dataset. However, a specific method of performing unsupervised domain adaptation may vary according to embodiments.

In some embodiments, the second model may be built by additionally training the first model based on a consistency loss between a data sample belonging to an unlabeled dataset and a virtual data sample generated from the data sample. In this case, the second model may be built without using a labeled dataset (i.e., a training dataset) of the first model (i.e., in a source-free manner). The current embodiments will be described in detail later with reference to FIG. 12 through FIG. 18.

In some embodiments, the second model may be built using an unsupervised domain adaptation technique widely known in the art to which the present disclosure pertains.

Figure 5:
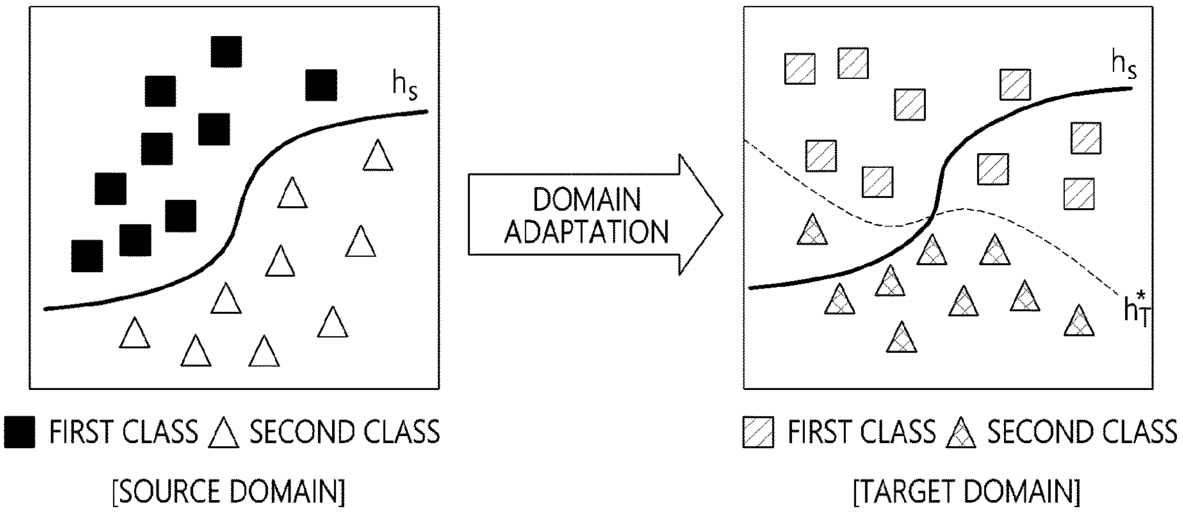
FIG. 5 is an example conceptual diagram illustrating a change in a model caused by unsupervised domain adaptation which may be referred to in some embodiments of the present disclosure.

FIG. 5 is an example conceptual diagram illustrating a change in a model caused by unsupervised domain adaptation. FIG. 5 illustrates a case where the first model is a classification model of a source domain and where the second model is built by adapting the first model to a target domain. In addition, in FIG. 5, a curve represented by a solid line (see $h_S$) is a classification curve of the first model (or a decision boundary of a source dataset), and a curve represented by a dotted line (see $h^*_T$) is a classification curve of the second model (or a decision boundary of a target dataset).

Referring back to FIG. 4, in operation S43, pseudo labels for an evaluation dataset may be generated using the second model. Here, the evaluation dataset may be an unlabeled dataset. In addition, the evaluation dataset may be, for example, a dataset of the same domain as the labeled dataset (i.e., the training dataset) of the first model or may be a dataset of a different domain (e.g., in a case where the training dataset is a dataset of the source domain).

In some embodiments of the present disclosure, the evaluation system 10 may generate the pseudo labels for the evaluation dataset by using adversarial noise. This will be described in detail later with reference to FIGS. 6 through 8.

In operation S44, the performance of the first model may be evaluated using the evaluation dataset and the pseudo labels. For example, the evaluation system 10 may obtain a predicted label for each data sample belonging to the evaluation dataset by inputting each data sample to the first model and evaluate the performance of the first model by comparing the obtained predicted label with a pseudo label of the data sample. In a more specific example, when the first model is a classification model, the evaluation system 10 may compare a class label (e.g., a predicted class, a confidence score for each class, etc.) predicted through the first model with a pseudo label to evaluate the accuracy of the first model (e.g., calculate a concordance rate between a predicted class and a class recorded in the pseudo label as the accuracy of the model).

For reference, a data sample may refer to one unit of data input to a model (e.g., the first model). In the art to which the present disclosure pertains, the term ‘sample’ or ‘data sample’ may be used interchangeably with terms such as example, instance, observation, record, unit data, and individual data.

The performance evaluation result obtained according to the above-described method may be utilized for various purposes. For example, the evaluation system 10 may utilize the performance evaluation result to select a source model suitable for the target domain (i.e., in a case where the first model is a source model) or to determine an update time (or performance degradation time) of the first model (e.g., in a case where the first model is a model in use (service) in the target domain). These utilization examples will be described in more detail later with reference to FIGS. 9 through 11.

Until now, the performance evaluation method according to the embodiments of the present disclosure has been described with reference to FIGS. 4 and 5. According to the above description, a second model (i.e., a temporary model) may be built by performing unsupervised domain adaptation on a first model (i.e., a model to be evaluated), and pseudo labels for an evaluation dataset may be generated using the second model. Accordingly, the performance of the first model may be easily evaluated even in an environment in which only unlabeled datasets exist or in an environment in which access to model training datasets is restricted. For example, the actual performance of a model (i.e., the performance when deployed in a real environment) may be easily evaluated by evaluating the performance of the model using an unlabeled dataset generated in the real environment. Alternatively, the performance of a source model for a target domain may be easily evaluated. Further, time and human costs required for labeling the evaluation dataset may be reduced.

A method of generating a pseudo label according to embodiments of the present disclosure will now be described with reference to FIGS. 6 through 8.

Figure 6:
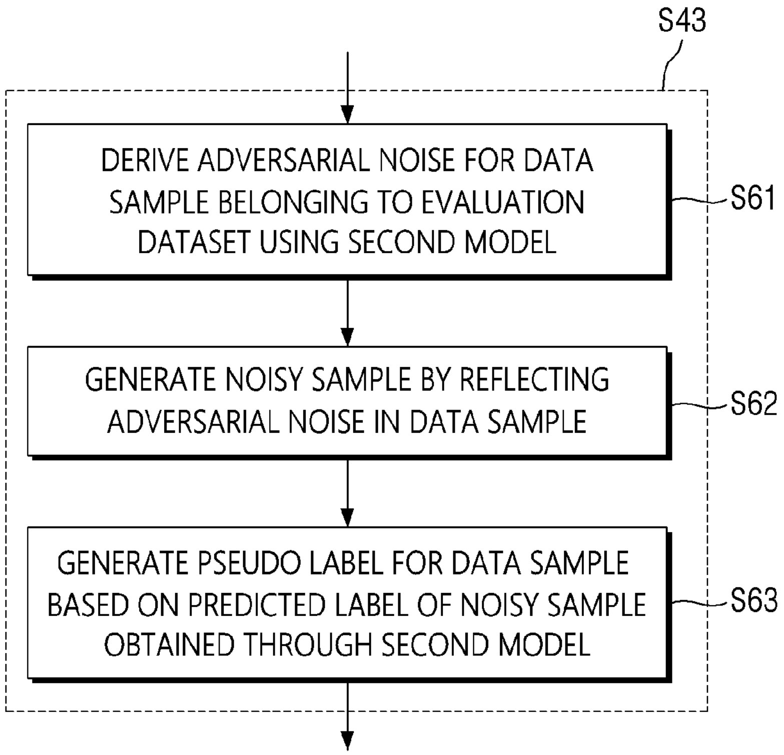
FIG. 6 is an example flowchart illustrating a method of generating a pseudo label according to embodiments of the present disclosure.

FIG. 6 is an example flowchart illustrating a method of generating a pseudo label according to embodiments of the present disclosure. However, this is only an exemplary embodiment for achieving the objectives of the present disclosure, and some operations may be added or deleted as needed.

As illustrated in FIG. 6, the method according to the embodiments may start with operation S61 in which adversarial noise for a data sample belonging to an evaluation dataset is derived using a second model. Here, the adversarial noise refers to noise (or perturbation) that may increase (e.g., maximize) a difference in predicted value (i.e., a difference in predicted label) between the data sample and a noisy sample (i.e., a sample obtained by reflecting the adversarial noise in the data sample). For reference, the ‘adversarial noise’ may be named as adversarial perturbation in some cases, and the ‘noisy sample’ may be named as a transformed/deformed sample or a perturbation sample. For better understanding, a method of deriving the adversarial noise will be described below in detail.

The evaluation system 10 may derive adversarial noise for a data sample by updating a value of a noise parameter in a direction to increase a difference between a predicted label of the data sample and a predicted label of a noisy sample obtained through the second model (e.g., by updating the value of the noise parameter through error backpropagation). Specifically, the evaluation system 10 may assign a predetermined initial value (e.g., a random value) to the noise parameter and update the value of the noise parameter in a direction to increase the difference between the two predicted labels. Here, the evaluation system 10 may derive the adversarial noise by updating the value of the noise parameter within a range that satisfies a preset size constraint condition (i.e., a condition that limits a maximum size of the adversarial noise). For example, the value of the noise parameter that may maximize the difference between the two predicted labels within the range that satisfies the preset size constraint condition may be derived as the adversarial noise of the data sample.

Figure 7:
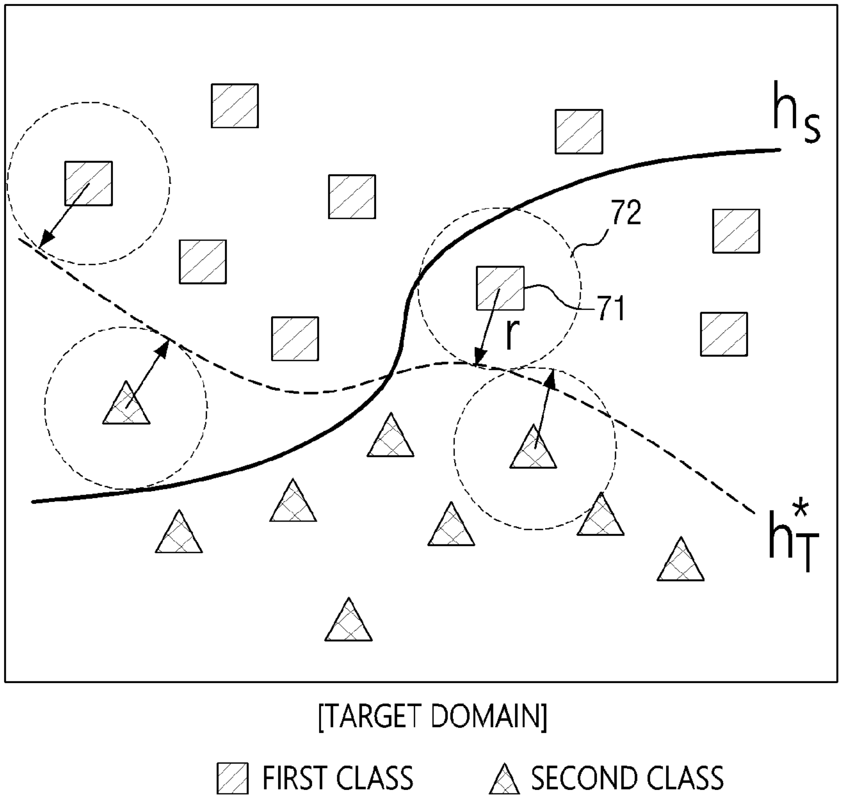
FIGS. 7 and 8 are example diagrams for further explaining the method of generating the pseudo label according to the embodiments of the present disclosure.
Figure 8:
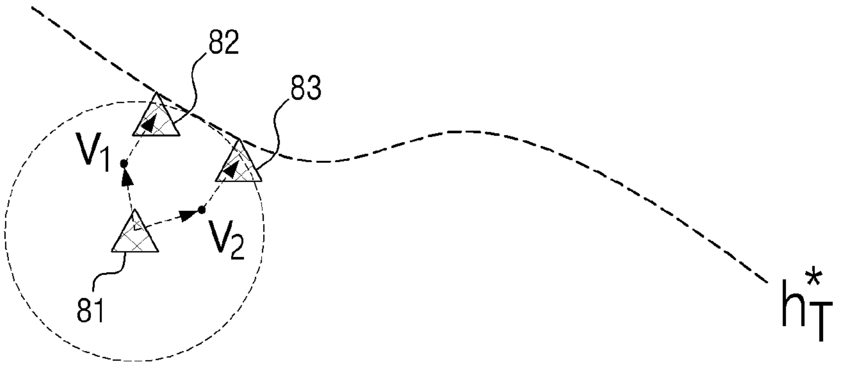

In the above case, as illustrated in FIG. 7, the value of the noise parameter (see r) may be updated in a direction to position the data sample (e.g., 71) close to a decision boundary (see $h^*_T$). As a result, the data sample (e.g., 71) may be transformed into a noisy sample located closer to the decision boundary of the second model.

For reference, in FIG. 7, the radius of a circle (see a dotted line) having the data sample (e.g., 71) as its center represents a size constraint condition for the noise parameter. In addition, it may be understood that the size constraint condition is set to prevent the update of the noise parameter from being repeated indefinitely or to prevent the data sample from being unintentionally transformed into noise itself.

If the second model is a classification model, a value of a predicted label corresponds to a confidence score for each class (i.e., a probability distribution for class). Therefore, the difference between the two predicted labels may be calculated based on, for example, Kullback-Leibler divergence. However, the scope of the present disclosure is not limited thereto.

In addition, in some embodiments, the evaluation system 10 may generate N (or K) noisy samples for one data sample by repeating the adversarial noise derivation process N times (where N is a natural number equal to or greater than 1). For example, as illustrated in FIG. 8, the evaluation system 10 may derive a first adversarial noise by assigning a first initial value (see $V_1$) to a noise parameter and performing an update and may derive a second adversarial noise by assigning a second initial value (see $V_2$, i.e., a value different from the first initial value) to the noise parameter (e.g., by assigning different random values) and performing an update. As a result, N noisy samples 82 and 83 may be generated for one data sample 81. FIG. 8 illustrates a case where N is 2.

Referring back to FIG. 6, in operation S62, a noisy sample may be generated by reflecting (e.g., adding) the adversarial noise in the data sample. As described above, when N adversarial noises are derived, N noisy samples may be generated.

In operation S63, a pseudo label for the data sample may be generated based on a predicted label of the noisy sample obtained through the second model. For example, the evaluation system 10 may designate the predicted label of the noisy sample as the pseudo label of the data sample. In another example, the evaluation system 10 may generate a pseudo label by further performing a predetermined operation on the predicted label of the noisy sample. If N noisy samples are generated, the evaluation system 10 may generate the pseudo label of the data sample by aggregating predicted labels of the N noisy samples (e.g., by calculating the average of label values).

Until now, the method of generating the pseudo label according to the embodiments of the present disclosure has been described with reference to FIGS. 6 through 8. As described above, pseudo labels for an evaluation dataset may be generated without using a labeled dataset of a first model. In addition, a pseudo label of a data sample may be generated based on a predicted label of a noisy sample generated by reflecting adversarial noise. By using the pseudo label thus generated, it is possible to greatly improve the accuracy of performance evaluation for the first model. This may be understood from Table 1 and FIG. 19.

Various utilization examples of the above-described performance evaluation method will now be described with reference to FIGS. 9 through 11.

Figure 9:
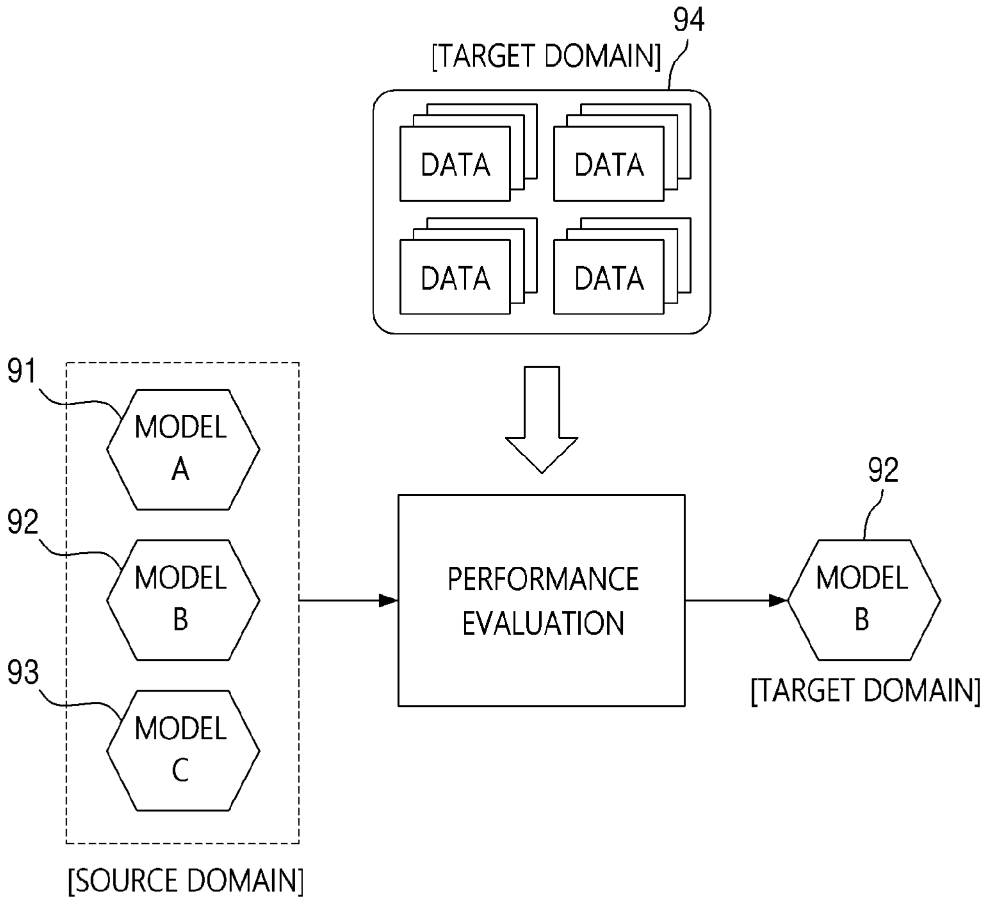
FIGS. 9 through 11 are example diagrams for explaining utilization examples of the performance evaluation method according to the embodiments of the present disclosure.

FIG. 9 is a diagram for explaining a utilization example of the performance evaluation method according to the embodiments of the present disclosure.

As illustrated in FIG. 9, the above-described performance evaluation method may be utilized to select a source model 92 to be applied (deployed) to a target domain from among a plurality of source models 91 through 93 belonging to the same source domain. Here, the source models 91 through 93 may be models having different characteristics, for example, models having different types and structures. FIG. 9 illustrates a case where the source model 92 (B) among the three source models 91 through 93 is selected as a model to be applied to the target domain.

For example, the evaluation system 10 may perform performance evaluation on each of the source models 91 through 93 using an unlabeled dataset 94 of the target domain and may select a source model 92 (e.g., a model with the best performance) to be applied to the target domain based on the evaluation result. In this case, the source model 92 having the most suitable characteristics for the target domain among the source models 91 through 93 having various characteristics may be accurately selected as a model to be applied to the target domain.

In addition, the evaluation system 10 may perform unsupervised domain adaptation on the selected source model 92 or may build a target model from the selected source model 92 through a process of obtaining a labeled dataset and performing additional learning. Then, the evaluation system 10 may provide a service in the target domain using the target model or may provide the built target model to a separate service system.

Figure 10:
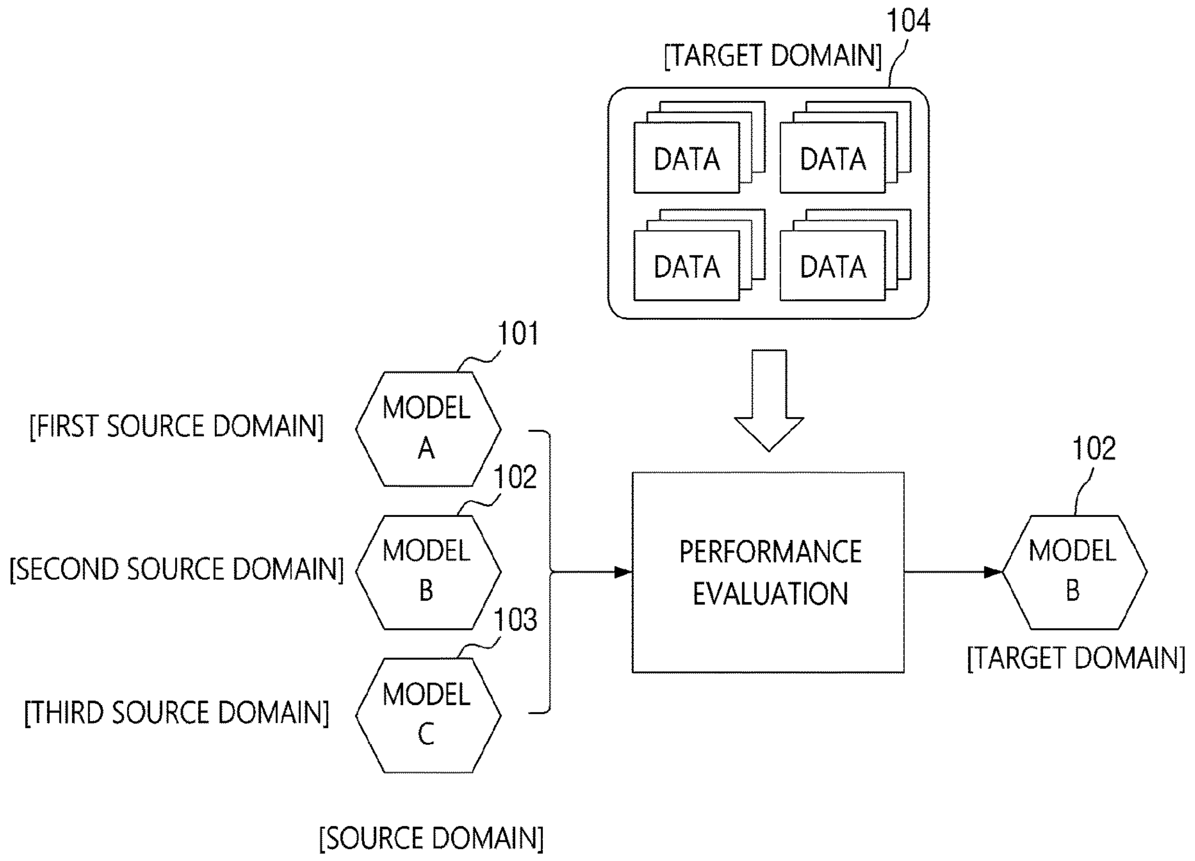

FIG. 10 is a diagram for explaining a utilization example of the performance evaluation method according to the embodiments of the present disclosure. For clarity of the present disclosure, any description overlapping that of the previous embodiments will be omitted.

As illustrated in FIG. 10, the above-described performance evaluation method may be utilized to select a source model 102 to be applied (deployed) to a target domain from among a plurality of source models 101 through 103. Here, the source models 101 through 103 may be models belonging to different source domains. FIG. 10 illustrates a case where the source model 102 (B) among the three source models 101 through 103 is selected as a model to be applied to the target domain.

For example, the evaluation system 10 may perform performance evaluation on each of the source models 101 through 103 using an unlabeled dataset 104 of the target domain and may select a source model 102 (e.g., a model with the best performance) to be applied to the target domain based on the evaluation result. In this case, the model 102 of a domain having the highest relevance to the target domain among various source domains may be accurately selected as a model to be applied to the target domain.

Figure 11:
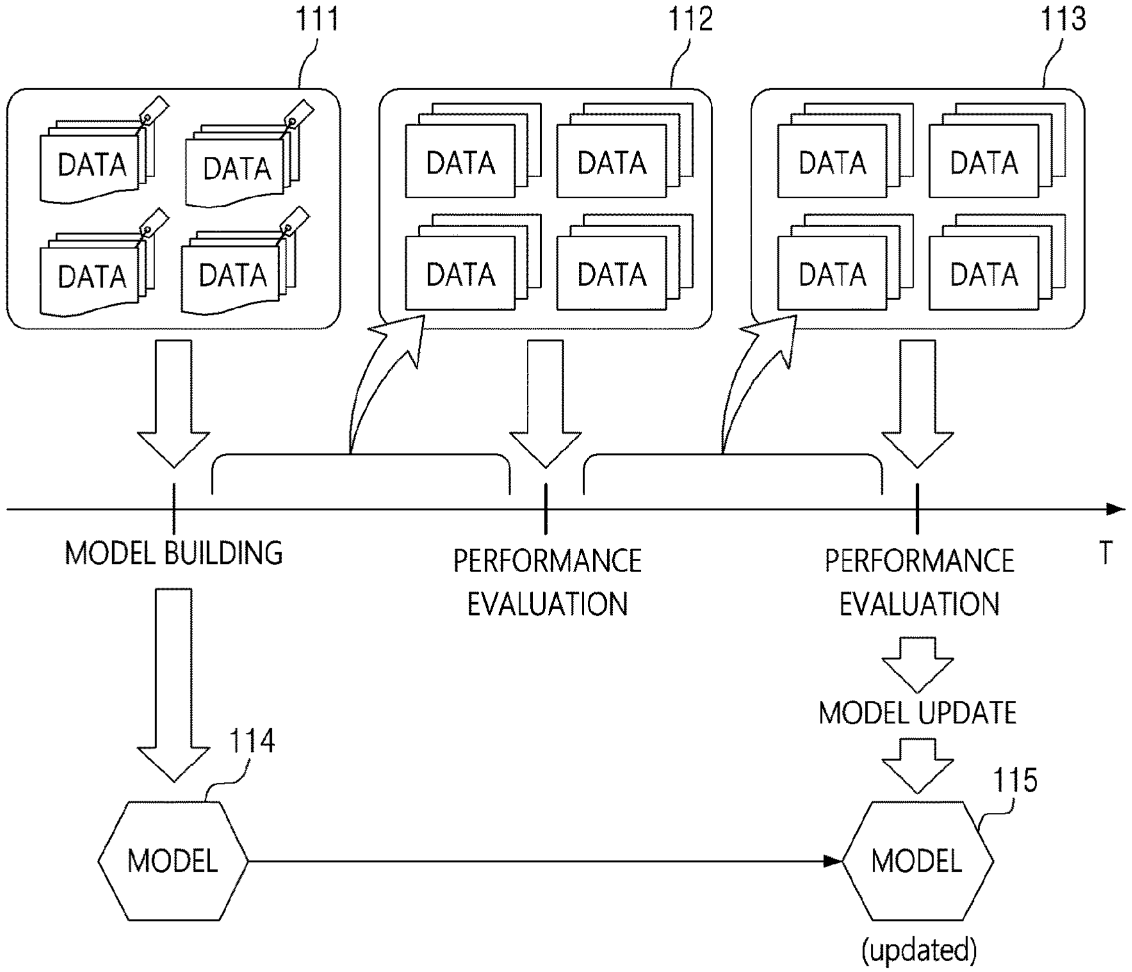

FIG. 11 is a diagram for explaining a utilization example of the performance evaluation method according to the embodiments of the present disclosure.

As illustrated in FIG. 11, the above-described performance evaluation method may be utilized to determine an update time (or performance degradation time) of a model 114 deployed in a specific domain.

Specifically, it is assumed that the model 114 is built using a labeled dataset 111 of a specific domain. In this case, the evaluation system 10 may repeatedly evaluate the performance of the model 114 using recently generated unlabeled datasets 112 and 113. For example, the evaluation system 10 may evaluate the performance of the model 114 periodically or non-periodically.

When the evaluated performance does not satisfy a predetermined condition (e.g., when the accuracy of the model 114 is less than a reference value), the evaluation system 10 may determine that the model 114 needs to be updated.

In addition, the evaluation system 10 may update the model 114 using various methods such as unsupervised domain adaptation, additional learning using a labeled dataset, and model rebuilding using a labeled dataset. Furthermore, the evaluation system 10 may provide a service in the domain using the updated model 115 or may provide the updated model 115 to a separate service system.

According to the above description, the update time of the model 114 may be accurately determined. In addition, even if the distribution of an actual dataset changes over time, the service quality of the model 114 or 115 may be continuously guaranteed through update.

Until now, various utilization examples of the performance evaluation method according to the embodiments of the present disclosure have been described with reference to FIGS. 9 through 11. Hereinafter, an unsupervised domain adaptation method according to embodiments of the present disclosure will be described with reference to FIGS. 12 through 18.

Figure 12:
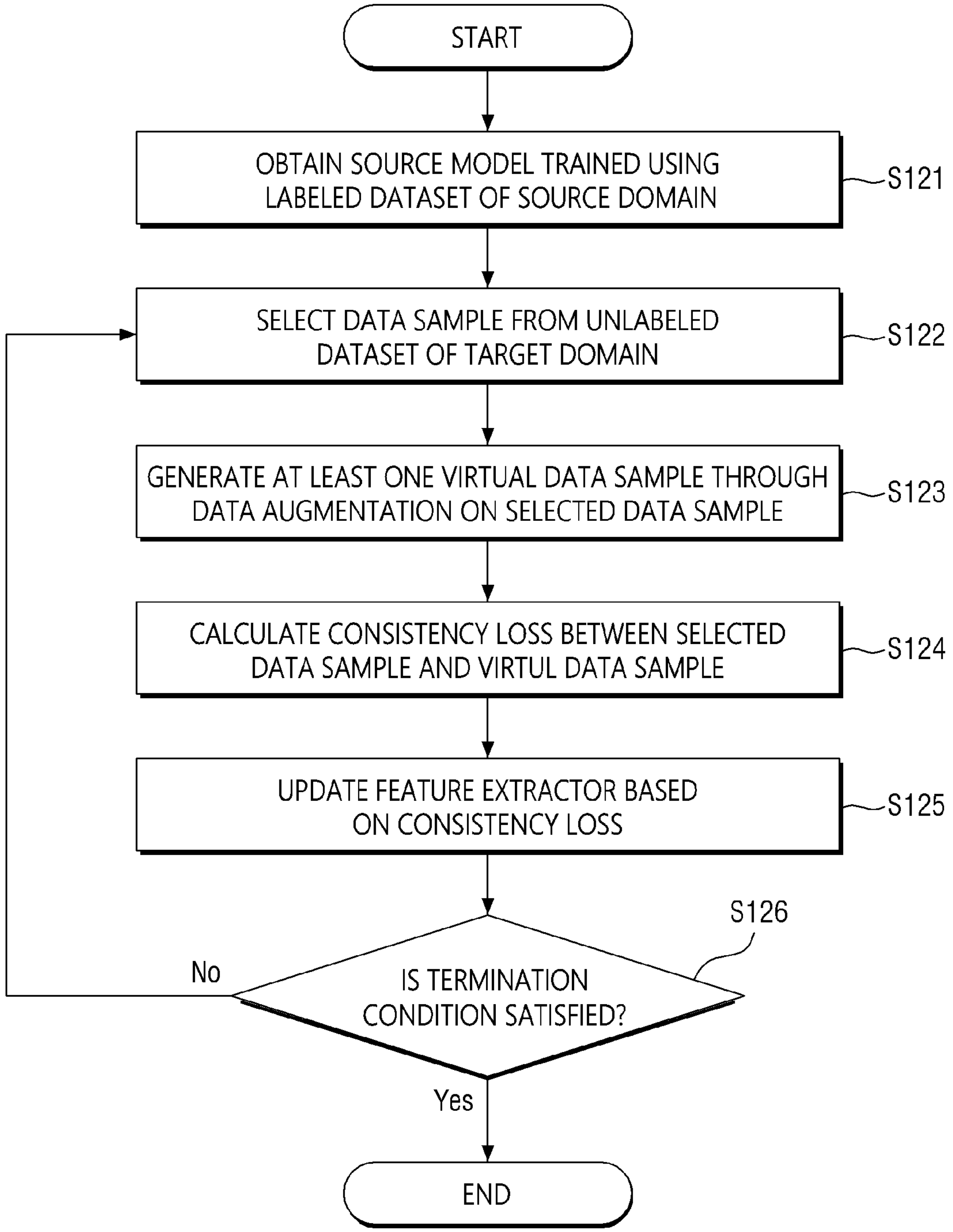
FIG. 12 is an example flowchart illustrating an unsupervised domain adaptation method according to embodiments of the present disclosure.

FIG. 12 is an example flowchart illustrating an unsupervised domain adaptation method according to embodiments of the present disclosure. Ho lever, this is only an exemplary embodiment for achieving the objectives of the present disclosure, and some operations may be added or deleted as needed.

As illustrated in FIG. 12, the method according to the embodiments may start with operation S121 in which a source model trained (i.e., supervised learning) using a source dataset (i.e., a labeled dataset of a source domain) is obtained. A specific method of training the source model may be any method.

Figure 13:
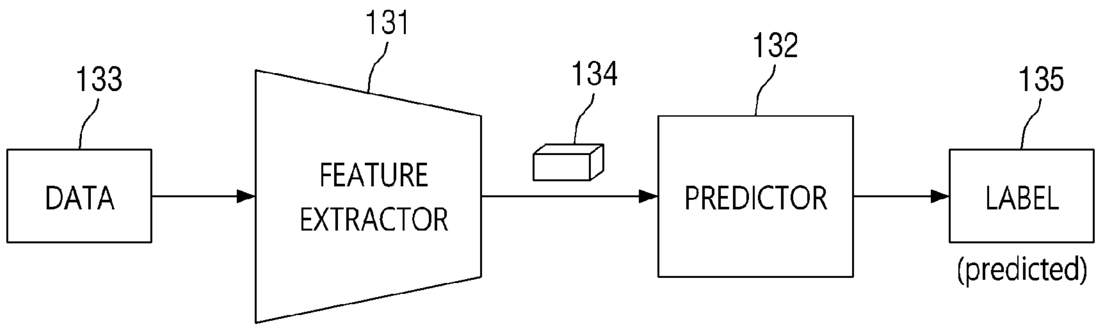
FIG. 13 illustrates an example structure of a source model which may be referred to in some embodiments of the present disclosure.

An example structure of the source model is illustrated in FIG. 13. For ease of understanding, the structure and operation of the source model will now be briefly described.

As illustrated in FIG. 13, the source model may be configured to include a feature extractor 131 and a predictor 132. In some cases, the source model may further include other modules.

The feature extractor 131 may refer to a module that extracts a feature 134 from an input data sample 133. The feature extractor 131 may be implemented as, for example, a neural network layer and may be named a 'feature extraction layer' in some cases. For example, if the feature extractor 131 is a module that extracts a feature from an image, it may be implemented as a convolutional neural network (or layer). However, the scope of the present disclosure is not limited thereto.

The predictor 132 may refer to a module that predicts a label 135 of the data sample 133 from the extracted feature 134. The predictor 132 may be understood as a kind of task-specific layer, and a detailed structure of the predictor 132 may vary according to task. In addition, the format and value of the label 135 may vary according to task. Examples of the task may include classification, regression, and semantic segmentation which is a kind of classification task. However, the scope of the present disclosure is not limited by these examples.

The predictor 132 may also be implemented as, for example, a neural network layer and may be named as a 'prediction layer' or an 'output layer' in some cases. For example, if the predictor 132 is a module that outputs class classification results (e.g., a confidence score for each class), it may be implemented as a fully-connected layer. However, the scope of the present disclosure is not limited thereto.

Referring back to FIG. 12, in operation S122, a data sample may be selected from a target dataset (i.e., an unlabeled dataset of a target domain). The data sample may be selected in any way. For example, the evaluation system 10 may select a data sample in a random manner or may select a data sample in a sequential manner. If learning is performed on a batch-by-batch basis, the evaluation system 10 may select a number of data samples corresponding to the batch size and configure the selected data samples as one batch.

In operation S123, at least one virtual data sample may be generated through data augmentation on the selected data sample. The number of virtual data samples generated may vary, and the data augmentation method may also vary according to the type, domain, etc. of data.

In operation S124, a consistency loss between the selected data sample and the virtual data sample may be calculated. However, a specific method of calculating the consistency loss may vary according to embodiments.

In some embodiments, a feature-related consistency loss (hereinafter, referred to as a 'first consistency loss') may be calculated using a feature extractor of the source model. The first consistency loss may be used to additionally train the feature extractor to extract similar features from similar data belonging to the target domain. In other words, since the virtual data sample is derived from the selected data sample, the two data samples may be viewed as similar data. Therefore, if the feature extractor is additionally trained to extract similar features from the two data samples, it may be trained to extract similar features from similar data (e.g., data of the same class) belonging to the target domain. The first consistency loss may be calculated based on a difference between a feature extracted from the selected data sample and a feature extracted from the virtual data sample. This will be described later with reference to FIG. 16.

In some embodiments, a label-related consistency loss (hereinafter, referred to as a 'second consistency loss') may be calculated using the feature extractor and predictor of the source model. The second consistency loss may be used to additionally train the feature extractor to align a feature space (or distribution) of the target dataset with a feature space (or distribution) of the source dataset. That is, the second consistency loss may be used to align the distribution of the target dataset with the distribution of the source dataset, thereby converting the source model into a model suitable for the target domain. The second consistency loss may be calculated based on a difference between a pseudo label of the selected data sample and a predicted label of the virtual data sample. This will be described later with reference to FIGS. 17 and 18.

In some embodiments, a consistency loss may be calculated based on a combination of the above embodiments. For example, the evaluation system 10 may calculate a total consistency loss by aggregating the first consistency loss and the second consistency loss based on predetermined weights. Here, a weight assigned to the first consistency loss may be less than or equal to a weight assigned to the second consistency loss. In this case, it has been experimentally confirmed that the performance of a target model is further improved.

In operation S125, the feature extractor may be updated based on the consistency loss. For example, in a state where the predictor is frozen (or fixed) (i.e., the predictor is not updated), the evaluation system 10 may update a weight of the feature extractor in a direction to reduce the consistency loss. In this case, since the predictor serves as an anchor, the feature space of the target dataset may be quickly and accurately aligned with the feature space of the source dataset. For better understanding, a further description will be made with reference to FIG. 14.

Figure 14:
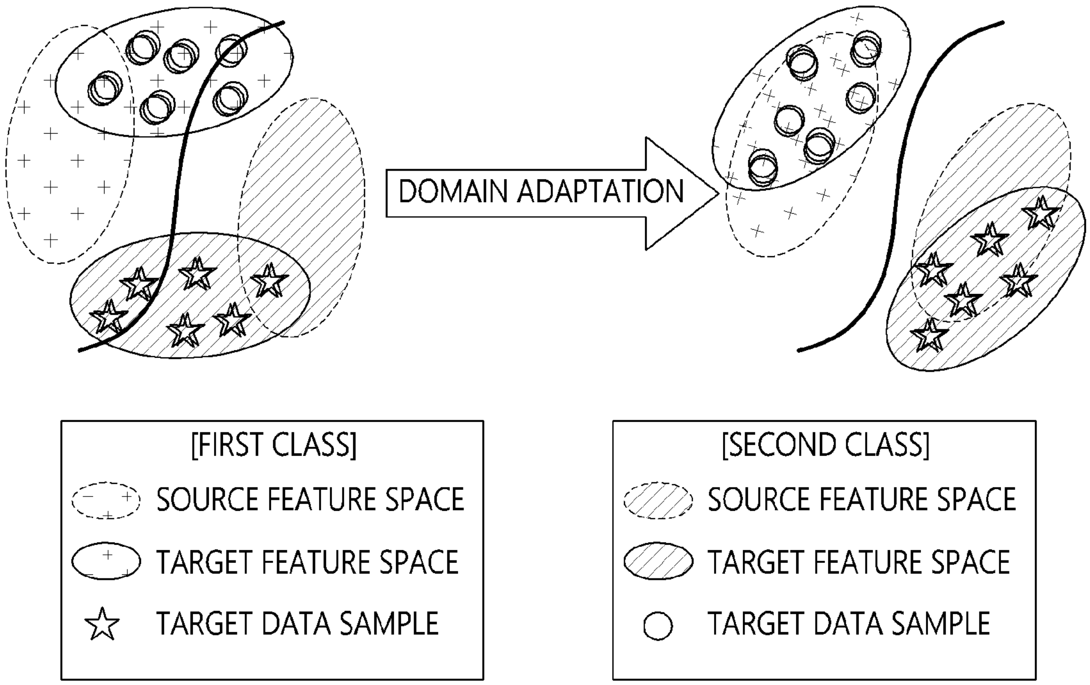
FIG. 14 is an example conceptual diagram illustrating a case where a feature space of a target dataset is aligned with a feature space of a source dataset due to an update of a feature extractor.

FIG. 14 is an example conceptual diagram illustrating a case where the feature space of the target dataset is aligned with the feature space of the source dataset due to an update of the feature extractor. FIG. 14 assumes that the predictor is configured to predict a class label, and a curve illustrated in FIG. 14 indicates a classification curve of the predictor trained using the source dataset.

As illustrated in FIG. 14, if the feature extractor is updated using the target dataset in a state where the predictor is frozen (see the classification curve in the fixed state), the feature space of the target dataset may be quickly and accurately aligned with the feature space of the source dataset. Accordingly, the problem of domain shift (see the left side of FIG. 14) may be easily solved, and the performance of the target model may be greatly improved.

On the other hand, if the feature extractor is updated together with the predictor, the speed at which the feature space of the target dataset and the feature space of the source dataset are aligned may be inevitably slow because the number of weight parameters to be updated increases significantly. In addition, even if the two feature spaces are aligned, the classification performance of the additionally trained model may not be guaranteed because the classification curve illustrated in FIG. 14 is also shifted.

According to embodiments of the present disclosure, an entropy loss for a confidence score for each class may be further calculated. That is, when the predictor is configured to calculate the confidence score for each class, the entropy loss may be calculated based on an entropy value for the confidence score for each class. Then, the feature extractor may be updated based on the calculated entropy loss (i.e., a weight parameter of the feature extractor may be updated in a direction to reduce the entropy loss). The concept and calculation method of entropy will be already familiar to those skilled in the art, and thus a description thereof will be omitted. The entropy loss may prevent the confidence score for each class from being calculated as an ambiguous value (e.g., prevent each class from having a similar confidence score). For example, the entropy loss may be used to prevent the predictor from outputting an ambiguous confidence score for each class by additionally training the feature extractor so that features extracted from the target dataset move away from a decision (classification) boundary in the feature space. Accordingly, the performance of the target model may be further improved.

Figure 15:
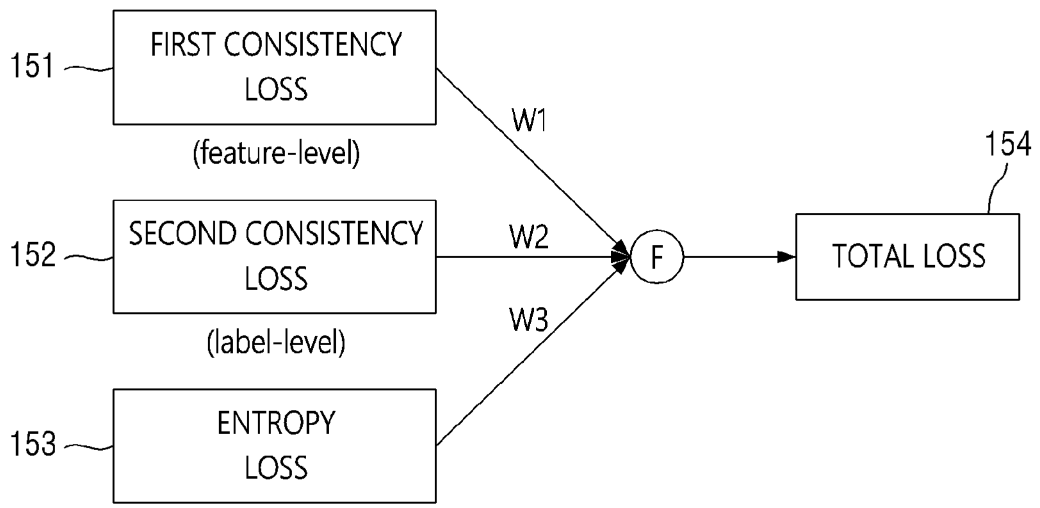
FIG. 15 is an example diagram for explaining a loss calculation method according to embodiments of the present disclosure.

In addition, in some embodiments, a total loss may be calculated by aggregating at least one of the first and second consistency losses and the entropy loss based on predetermined weights, and the feature extractor may be updated based on the total loss. For example, the evaluation system 10 may calculate the total loss by aggregating the first consistency loss and the entropy loss based on predetermined weights. Here, a weight assigned to the entropy loss may be greater than or equal to a weight assigned to the first consistency loss. In this case, it has been confirmed that the performance of the target model is further improved. In another example, the evaluation system 10 may calculate the total loss by aggregating the second consistency loss and the entropy loss based on predetermined weights. Here, the weight assigned to the entropy loss may be less than or equal to a weight assigned to the second consistency loss. In this case, it has been confirmed that the performance of the target model is further improved. In another example, as illustrated in FIG. 15, the evaluation system 10 may calculate a total loss 154 by aggregating two consistency losses 151 and 152 and an entropy loss 153 based on predetermined weights W1 through W3. Here, a second weight W2 may be greater than or equal to a first weight W1 and a third weight W3, and the third weight W3 may be set to a value greater than or equal to the first weight W1. In this case, it has been confirmed that the performance of the target model is further improved. For example, the first weight W1 may be set to a value between about 0 and 0.5, the second weight W2 may be set to a value greater than or equal to about 1.0, and the third weight W3 may be set to a value between about 0.5 and 1.0. However, the scope of the present disclosure is not limited thereto.

Referring back to FIG. 12, in operation S126, it is determined whether a termination condition is satisfied. If the termination condition is not satisfied, operations S122 through S125 described above may be repeated. If satisfied, the additional training of the source model may end. Accordingly, the target model may be built.

The termination condition may be variously set based on, for example, loss (e.g., consistency loss, entropy loss, total loss, etc.) and the number of times of learning. For example, the termination condition may be set to a condition in which a calculated loss is less than or equal to a reference value. However, the scope of the present disclosure is not limited thereto.

Until now, the unsupervised domain adaptation method according to the embodiments of the present disclosure has been described with reference to FIGS. 12 through 15. Hereinafter, methods of calculating a consistency loss will be described in more detail with reference to FIGS. 16 through 18.

Figure 16:
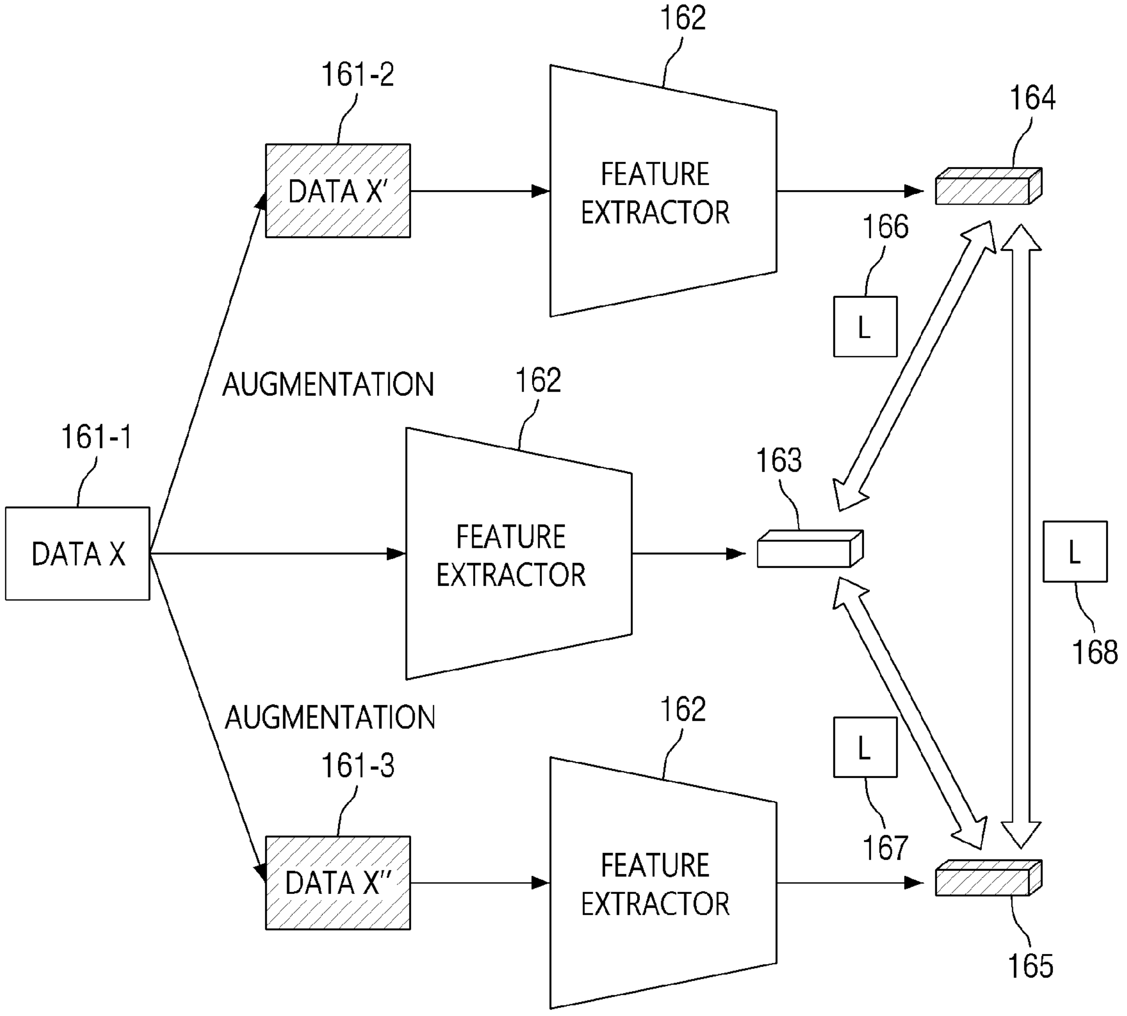
FIG. 16 is an example diagram for explaining a method of calculating a consistency loss according to embodiments of the present disclosure.

FIG. 16 is an example diagram for explaining a method of calculating a consistency loss according to embodiments of the present disclosure. FIG. 16 illustrates a case where two virtual data samples 161-2 and 161-3 are generated from a data sample 161-1 of a target dataset. For a clearer explanation, the data sample 161-1 and the two virtual data samples 161-2 and 161-3 will hereinafter be referred to as a 'first data sample 161-1 (see x)', a 'second data sample 161-2 (see x')', and a 'third data sample 161-3 (see x")', respectively.

As illustrated in FIG. 16, the current embodiments relate to a method of calculating a feature-related consistency loss (i.e., the above-described 'first consistency loss').

The evaluation system 10 may extract features 163 through 165 respectively from the first through third data samples 161-1 through 161-3 through a feature extractor 162. In addition, the evaluation system 10 may calculate a consistency loss (e.g., 166) based on a difference (or distance) between the extracted features (e.g., 163 and 164).

For example, the evaluation system 10 may calculate a consistency loss 166 based on a difference between the feature 163 (hereinafter, referred to as a 'first feature') extracted from the first data sample 161-1 and the feature 164 (hereinafter, referred to as a 'second feature') extracted from the second data sample 161-2. In addition, the evaluation system 10 may calculate a consistency loss 167 based on the first feature 163 and the feature 165 (hereinafter, referred to as a 'third feature') extracted from the third data sample 161-3.

In another example, the evaluation system 10 may calculate a consistency loss 168 between the virtual data samples 161-2 and 161-3 based on a difference between the second feature 164 and the third feature 165.

In another example, the evaluation system 10 may calculate a consistency loss based on various combinations of the above examples. For example, the evaluation system 10 may calculate a total consistency loss by aggregating the consistency losses 166 through 168 based on predetermined weights. Here, a smaller weight may be assigned to the consistency loss 168 between the virtual data samples 161-2 and 161-3 than to the other losses 166 and 167.

In the current embodiments, the difference (or distance) between the features (e.g., 163 and 164) may be calculated by, for example, a cosine distance (or similarity). However, the scope of the present disclosure is not limited thereto. The concept and calculation method of the cosine distance will be already familiar to those skilled in the art, and thus a description thereof will be omitted.

A method of calculating a consistency loss according to embodiments of the present disclosure will now be described with reference to FIGS. 17 and 18.

The current embodiments relate to a method of calculating a label-related consistency loss (i.e., the above-described 'second consistency loss'), and this consistency loss may be calculated based on a difference between a pseudo label for a selected data sample and a predicted label of a virtual data sample.

First, a method of generating a pseudo label for a data sample will be described with reference to FIG. 17. For ease of understanding, the method of generating the pseudo label will be described based on the assumption that a predictor of a source model is configured to calculate a confidence score for each class (i.e., a case where the source model is a classification model).

Figure 17:
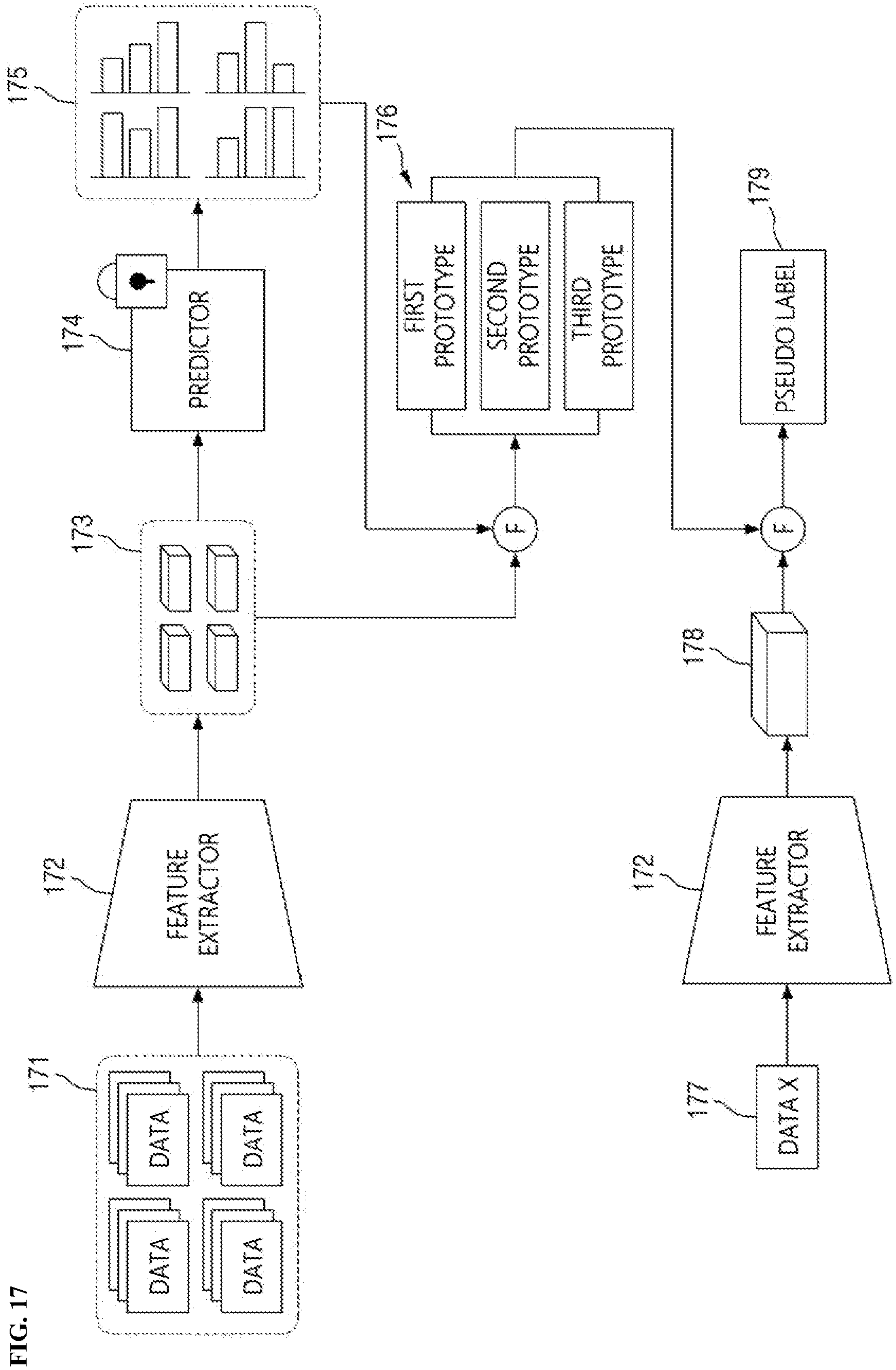
FIG. 17 is an example diagram for explaining a method of generating a pseudo label for unsupervised domain adaptation according to embodiments of the present disclosure.

As illustrated in FIG. 17, the evaluation system 10 may extract a feature 173 from each of a plurality of data samples 171 through a feature extractor 172. Then, the evaluation system 10 may calculate a confidence score 175 for each class from each of the extracted features 173 through a predictor 174. FIG. 17 illustrates a case where the number of classes is three.

Next, the evaluation system 10 may generate a prototype feature 176 for each class by reflecting the confidence score 175 for each class in the features 173 and then aggregating the resultant features. For example, the evaluation system 10 may generate a prototype feature of a first class (see 'first prototype') by reflecting (e.g., multiplying) a confidence score of the first class in each of the features 173 and then aggregating (e.g., averaging, multiplying, multiplying by element, etc.) the resultant features. In addition, the evaluation system 10 may generate prototype features of other classes (see 'second prototype' and 'third prototype') in a similar manner.

Next, the evaluation system 10 may generate a pseudo label 179 of a data sample 177 based on a similarity between a feature 178 extracted from the data sample 177 (see x) and the prototype feature 176 for each class. For example, the evaluation system 10 may calculate a label value for the first class based on the similarity between the extracted feature 178 and the prototype feature of the first class and may calculate label values for other classes in a similar manner. As a result, the pseudo label 179 may be generated.

The similarity between the extracted feature 178 and the prototype feature 176 for each class may be calculated using various methods such as cosine similarity and inner product, and any method may be used to calculate the similarity.

According to the current embodiments, the prototype feature 176 for each class may be accurately generated by weighting and aggregating the features 173 extracted from the data samples 171 based on the confidence score 175 for each class. As a result, the pseudo label 179 for the data sample 177 may be accurately generated.

In the current embodiments, the data samples 171 may be determined in various ways. For example, the data samples 171 may be samples belonging to a batch of data samples 177 for which pseudo labels are to be generated. In this case, the prototype feature (e.g., 176) for each class may be generated for each batch. In another example, the data samples 171 may be samples selected from the target dataset based on the confidence score for each class. In other words, the evaluation system 10 may select at least one data sample, in which the confidence score of the first class is equal to or greater than a reference value, from the target dataset and then generate a prototype feature of the first class by reflecting the confidence score of the first class in a feature of the selected data sample. In addition, the evaluation system 10 may generate prototype features of other classes in a similar manner. In this case, the prototype feature (e.g., 176) for each class may be generated more accurately.

As described above, when a pseudo label for a selected data sample is generated, the evaluation system 10 may calculate a consistency loss (i.e., the second consistency loss) based on a difference between a predicted label for a virtual data sample and the pseudo label. For example, the evaluation system 10 may predict a label of a virtual data sample through a feature extractor and a predictor (i.e., through a feed-forward process on the source model) and calculate the second consistency loss based on a difference between the predicted label (e.g., the confidence score for each class) and the pseudo label of the selected data sample. If the predictor is configured to calculate the confidence score for each class, the difference between the predicted label and the pseudo label may be calculated based on, for example, cross entropy. However, the scope of the present disclosure is not limited thereto. For better understanding, the above operation will be further described with reference to FIG. 18.

Figure 18:
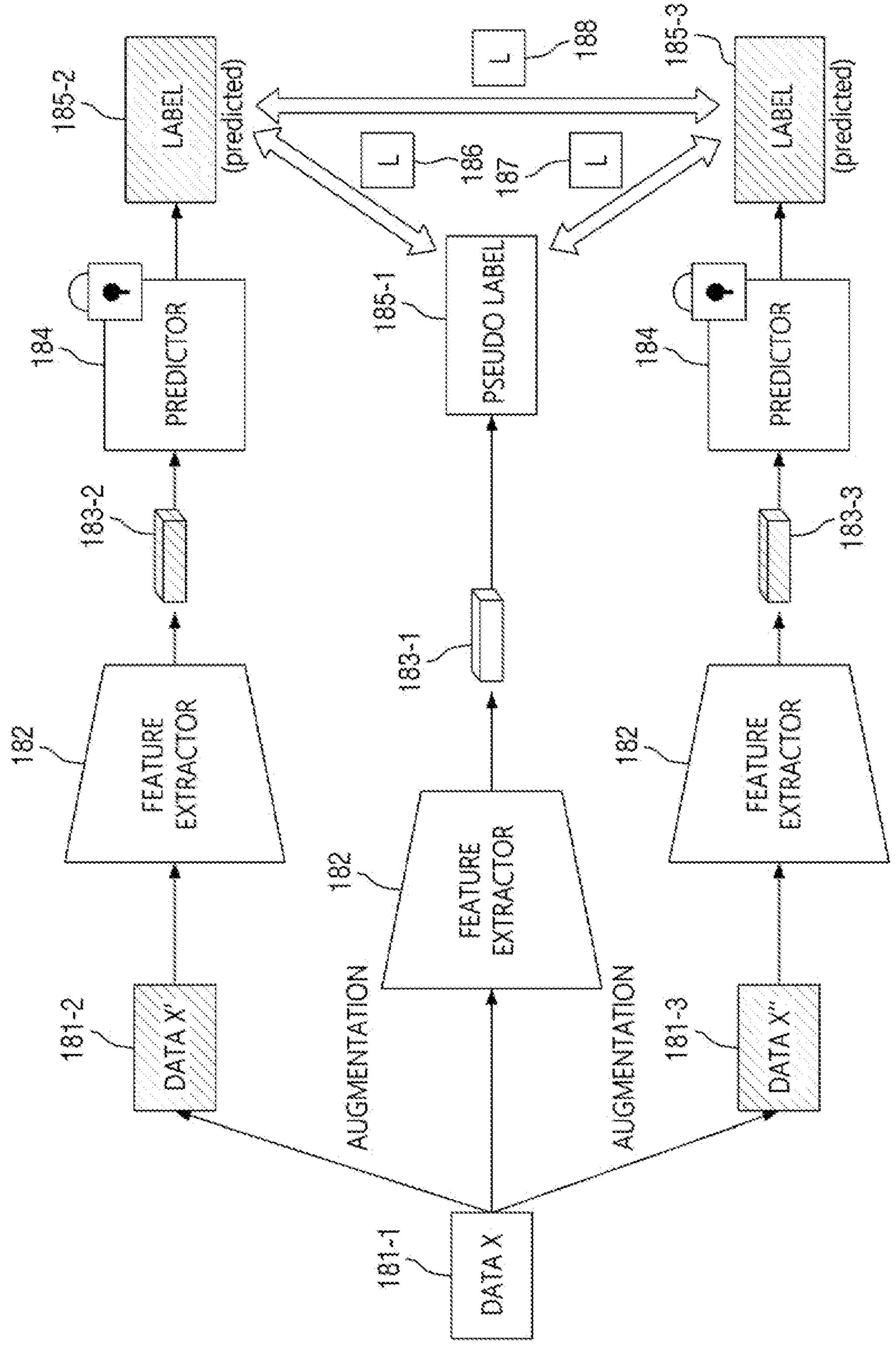
FIG. 18 is an example diagram for explaining a method of calculating a consistency loss according to embodiments of the present disclosure.

FIG. 18 illustrates, like FIG. 16, a case where two virtual data samples 181-2 and 181-3 are generated from a data sample 181-1 of the target dataset. For a clearer explanation, the data sample 181-1 and the two virtual data samples 181-2 and 181-3 will be referred to as a 'first data sample 181-1 (see x)', a 'second data sample 181-2 (see x')', and a 'third data sample 181-3 (see x")', respectively. For reference, a lock symbol shown on a predictor 184 in FIG. 18 indicates that the predictor 184 is in a frozen state.

As illustrated in FIG. 18, the evaluation system 10 may generate a pseudo label 185-1 using a feature 183-1 extracted from the first data sample 181-1. This may be understood from the description of FIG. 17.

Next, the evaluation system 10 may extract features 183-2 and 183-3 from the second data sample 181-2 and the third data sample 181-3 through a feature extractor 182. Then, the evaluation system 10 may input the extracted features 183-2 and 183-3 to the predictor 184 to predict labels 185-2 and 185-3 of the data samples 181-2 and 181-3.

Next, the evaluation system 10 may calculate consistency losses 186 and 187 based on differences between the pseudo label 185-1 and the predicted labels 185-2 and 185-3. For example, the evaluation system 10 may calculate the consistency loss 186 between the first data sample 181-1 and the second data sample 181-2 based on the difference (e.g., cross entropy) between the pseudo label 185-1 and the predicted label 185-2 and may calculate the consistency loss 187 between the first data sample 181-1 and the third data sample 181-3 based on the difference (e.g., cross entropy) between the pseudo label 185-1 and the predicted label 185-3.

In some cases, the evaluation system 10 may further calculate a consistency loss 188 between the virtual data samples 181-2 and 181-3 based on a difference between the predicted labels 185-2 and 185-3.

In addition, in some cases, the evaluation system 10 may calculate a total consistency loss by aggregating the exemplified consistency losses 186 through 188 based on predetermined weights. Here, a smaller weight may be assigned to the consistency loss 188 between the virtual data samples 181-2 and 181-3 than to the other losses 186 and 187.

Until now, embodiments of the consistency loss calculation method have been described in detail with reference to FIGS. 16 through 18. According to the above description, the feature-related consistency loss (i.e., the 'first consistency loss') and the label-related consistency loss (i.e., the 'second consistency loss') may be accurately calculated, and a high-performance target model may be built by training the feature extractor using the calculated consistency loss.

Until now, the unsupervised domain adaptation method according to the embodiments of the present disclosure has been described with reference to FIGS. 12 through 18. According to the above description, domain adaptation may be performed on a source model using only an unlabeled dataset of a target domain (i.e., in an unsupervised manner). Therefore, domain adaptation may be easily performed even in an environment in which access to a labeled dataset of a source domain is restricted due to reasons such as security and privacy. In addition, a high-performance target model may be built by aligning a feature space of a target dataset (or domain) with a feature space of a source dataset (or domain) based on a consistency loss.

Results of experiments conducted on the performance evaluation method (hereinafter, referred to as a 'proposed method') according to the embodiments of the present disclosure will now be briefly described.

The inventors of the present disclosure conducted an experiment to measure the actual accuracy (see 'actual accuracy') of a source model using a labeled dataset of a target domain and evaluate the actual accuracy (see 'predicted accuracy') of the source model using the same dataset without a label according to FIG. 4. The results of the experiment are shown in Table 1. Here, MNIST, Street View House Numbers (SVHN), United States Postal Service (USPS), and Visual Domain Adaptation (VisDA) datasets shown in Table 1 will be already familiar to those skilled in the art, and thus a description thereof will be omitted.

TABLE 1

| Source dataset | Target dataset | Actual accuracy (%) | Predicted accuracy (%) |
|---|---|---|---|
| MNIST | SVHN | 42.5 | 41.4 |
| | USPS | 97.8 | 97.5 |
| Office-31 | DSLR | 81.5 | 82.9 |
| | Webcam | 75.2 | 77.41 |
| VisDA (synthetic) | VisDA (actual) | 57.7 | 56.8 |

As shown in Table 1, the accuracy of the source model evaluated by the proposed method is hardly different from the actual accuracy measured through the labeled dataset, and an evaluation error of the proposed method is maintained at a very small value regardless of the source domain and the target domain. Accordingly, it may be seen that the actual performance of a model may be accurately evaluated if a pseudo label of an evaluation dataset is generated as described above.

In addition, in order to find out the effect of adversarial noise, the present inventors conducted an experiment to compare the accuracy of a case where adversarial noise was used and the accuracy of a case where adversarial noise was not used. A CIFAR-10 dataset was used as a source dataset, and a CIFAR-10-C (corruption) dataset was used as a target dataset. The results of the experiment are shown in FIG. 19.

Figure 19:
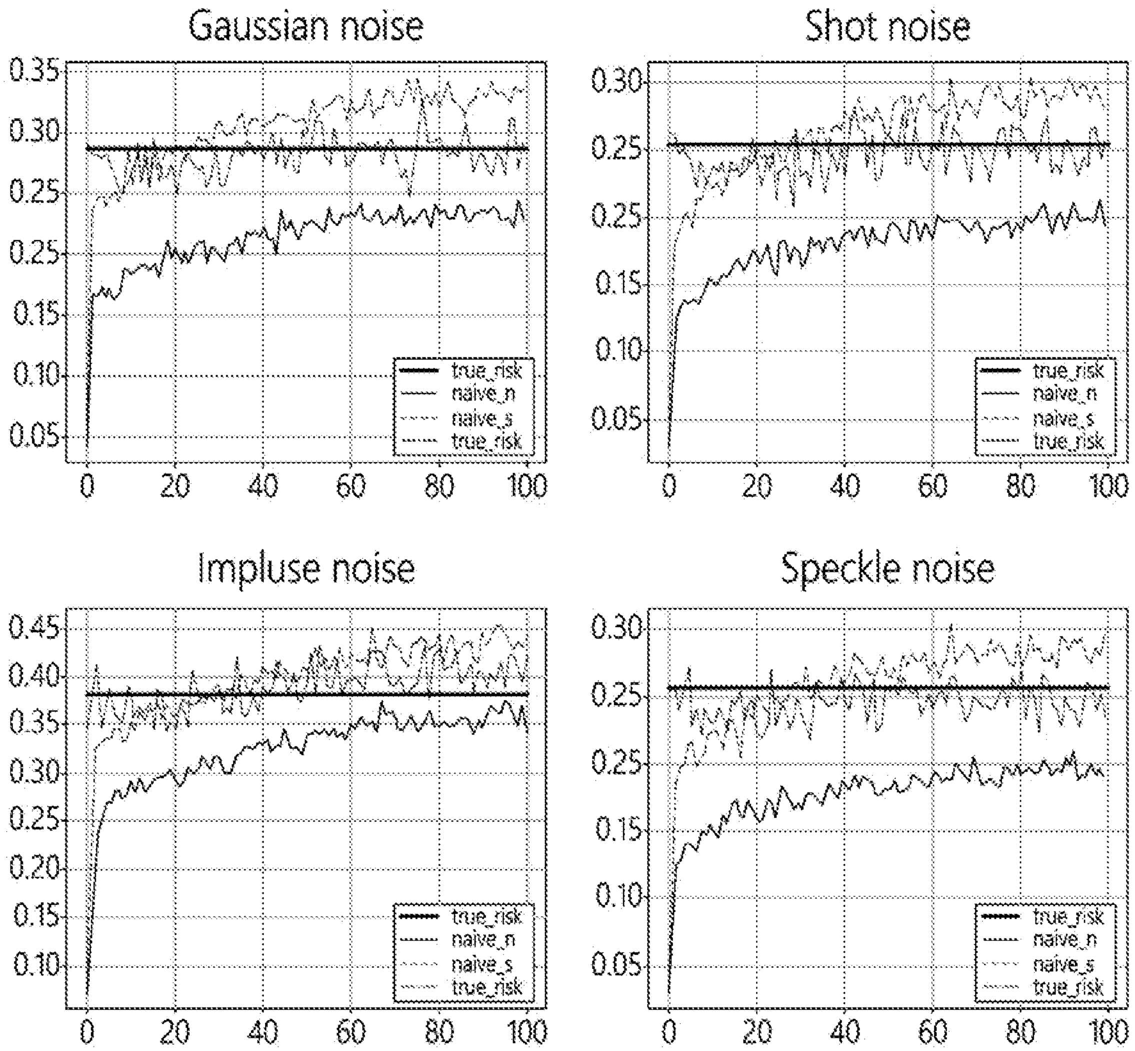
FIG. 19 illustrates results of an experiment on the performance evaluation method according to the embodiments of the present disclosure.

In FIG. 19, 'naïve_n' means a case where a target model is built from a source model through unsupervised domain adaptation and then pseudo labels for the target dataset are generated without using adversarial noise. In addition, 'naïve_s' means a case where performance evaluation is performed in the same way as 'naïve_n' except that pseudo labels are generated for a virtual dataset (i.e., a set of similar samples generated through a data augmentation technique) generated from the target dataset. In addition, 'true-risk' means a value corresponding to '1-actual accuracy' ('actual accuracy' means the accuracy measured using a labeled dataset), and 'proposed' means a proposed method. Furthermore, the x-axis of the illustrated graph represents the number of iterations of unsupervised domain adaptation, the y-axis represents the risk value corresponding to '1-accuracy', and noises at the top of the graph represent noises used for corruption of a CIFAR-10 image.

As illustrated in FIG. 19, the accuracy (or risk) of a model evaluated using adversarial noise-based pseudo labels (i.e., evaluated by the proposed method) is hardly different from the actual accuracy (or risk) of the model. On the other hand, the accuracy of a model evaluated without using adversarial noise is quite different from the actual accuracy (or risk) of the model. Accordingly, it may be seen that if pseudo labels are generated using adversarial noise as described above, the performance of a model may be more accurately evaluated.

Until now, the results of the experiments on the performance evaluation method according to the embodiments of the present disclosure have been briefly described with reference to Table 1 and FIG. 19. Hereinafter, an example computing device 200 that may implement the evaluation system 10 according to the embodiments of the present disclosure will be described with reference to FIG. 20.

FIG. 20 illustrates the hardware configuration of a computing device 200.

Referring to FIG. 20, the computing device 200 may include one or more processors 201, a bus 203, a communication interface 204, a memory 202 which loads a computer program 206 to be executed by the processors 201, and a storage 205 which stores the computer program 206. In FIG. 20, only the components related to the embodiments of the present disclosure are illustrated. Therefore, it will be understood by those of ordinary skill in the art to which the present disclosure pertains that other general-purpose components may be included in addition to the components illustrated in FIG. 20. That is, the computing device 200 may further include various components other than the components illustrated in FIG. 20. In addition, in some cases, some of the components illustrated in FIG. 20 may be omitted from the computing device 200. Each component of the computing device 200 will now be described.

The processors 201 may control the overall operation of each component of the computing device 200. The processors 201 may include at least one of a central processing unit (CPU), a micro-processor unit (MPU), a micro-controller unit (MCU), a graphic processing unit (GPU), and any form of processor well known in the art to which the present disclosure pertains. In addition, the processors 201 may perform an operation on at least one application or program for executing operations/methods according to embodiments of the present disclosure. The computing device 200 may include one or more processors.

Next, the memory 202 may store various data, commands and/or information. The memory 202 may read the program 206 from the storage 205 in order to execute operations/methods according to embodiments of the present disclosure. The memory 202 may be implemented as a volatile memory such as a random access memory (RAM), but the technical scope of the present disclosure is not limited thereto.

Next, the bus 203 may provide a communication function between the components of the computing device 200. The bus 203 may be implemented as various forms of buses such as an address bus, a data bus, and a control bus.

Next, the communication interface 204 may support wired and wireless Internet communication of the computing device 200. In addition, the communication interface 204 may support various communication methods other than Internet communication. To this end, the communication interface 204 may include a communication module well known in the art to which the present disclosure pertains.

Next, the storage 205 may non-temporarily store one or more programs 206. The storage 205 may include a non-volatile memory such as a read only memory (ROM), an erasable programmable ROM (EPROM), an electrically erasable programmable ROM (EEPROM) or a flash memory, a hard disk, a removable disk, or any form of computer-readable recording medium well known in the art to which the present disclosure pertains.

Next, the computer program 206 may include one or more instructions for controlling the processors 201 to perform operations/methods according to various embodiments of the present disclosure when the computer program 206 is loaded into the memory 202. That is, the processors 201 may perform the operations/methods according to the various embodiments of the present disclosure by executing the loaded instructions.

For example, the computer program 206 may include instructions for performing an operation of obtaining a first model trained using a labeled dataset, an operation of obtaining a second model built by performing unsupervised domain adaptation on the first model, an operation of generating pseudo labels for an evaluation dataset using the second model, and an operation of evaluating the performance of the first model using the pseudo labels. In this case, the evaluation system 10 according to the embodiments of the present disclosure may be implemented through the computing device 200.

In some embodiments, the computing device 200 illustrated in FIG. 20 may be a virtual machine implemented based on cloud technology. For example, the computing device 200 may be a virtual machine operating on one or more physical servers included in a server farm. In this case, at least some of the processors 201, the memory 202, and the storage 205 illustrated in FIG. 20 may be virtual hardware, and the communication interface 204 may also be a virtualized networking element such as a virtual switch.

Until now, an example computing device 200 that may implement the evaluation system 10 according to the embodiments of the present disclosure has been described with reference to FIG. 20.

Until now, various embodiments of the present disclosure and effects of the embodiments have been described with reference to FIGS. 1 through 20. However, the effects of the technical spirit of the present disclosure are not restricted to the one set forth herein. The above and other effects of the embodiments will become more apparent to one of daily skill in the art to which the embodiments pertain by referencing the claims.

According to embodiments of the present disclosure, a temporary model may be built by performing unsupervised domain adaptation on a given model, and pseudo labels for an evaluation dataset may be generated using the temporary model. Accordingly, the performance of the given model may be easily evaluated even in an environment in which only unlabeled datasets exist or in an environment in which access to model training datasets is restricted. For example, the actual performance of a model (i.e., the performance when deployed in a real environment) may be easily evaluated by evaluating the performance of the model using an unlabeled dataset generated in the real environment. Alternatively, the performance of a source model for a target domain may be easily evaluated. Further, time and human costs required for labeling the evaluation dataset may be reduced.

In addition, a noisy sample may be generated by adding adversarial noise to a data sample belonging to the evaluation dataset, and a pseudo label of the data sample may be generated based on a predicted label for the noisy sample. By using the pseudo label thus generated, the performance of the model may be evaluated very accurately (see Table 1 and FIG. 19).

In addition, the performance of source models belonging to different source domains may be evaluated using an unlabeled dataset of the target domain, and the most suitable source model for the target domain may be accurately selected using the evaluation result.

In addition, the update time (or performance degradation time) of a model deployed in a specific domain may be accurately determined by repeatedly evaluating the performance of the model using a recent unlabeled dataset.

In addition, unsupervised domain adaptation may be performed on the source model using only an unlabeled dataset of the target domain. Therefore, embodiments of the present disclosure may be used to build a target model even in an environment in which access to label datasets of a source domain is restricted due to reasons such as security and privacy. That is, domain adaptation may be easily performed even in a source-free environment. In other words, unsupervised domain adaptation may be easily performed even in the source-free environment.

However, the effects of the technical spirit of the present disclosure are not restricted to the one set forth herein. The above and other effects of the present disclosure will become more apparent to one of daily skill in the art to which the present disclosure pertains by referencing the claims.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications may be made to the example embodiments without substantially departing from the principles of the present disclosure. Therefore, the disclosed example embodiments of the disclosure are used in a generic and descriptive sense only and not for purposes of limitation.

What is claimed is:

1. A method for evaluating performance, the method being performed by at least one computing device and comprising:

obtaining a first model trained using a labeled dataset;

obtaining a second model built by performing unsupervised domain adaptation on the first model;

generating pseudo labels for an evaluation dataset using the second model, wherein the evaluation dataset is an unlabeled dataset; and evaluating performance of the first model using the pseudo labels, wherein the generating of the pseudo labels comprises:

deriving adversarial noise for a data sample belonging to the evaluation dataset;

generating a noisy sample by reflecting the derived adversarial noise in the data sample; and generating a pseudo label for the data sample based on a predicted label of the noisy sample obtained through the second model.

2. The method of claim 1, wherein the unsupervised domain adaptation and the generating of the pseudo labels are performed without using the labeled dataset.

3. The method of claim 1, wherein the deriving of the adversarial noise comprises:
obtaining a first predicted label for the data sample through the second model;
generating a noisy sample by reflecting a value of a noise parameter in the data sample;
obtaining a second predicted label for the noisy sample through the second model;
updating the value of the noise parameter in a direction to increase a difference between the first predicted label and the second predicted label; and
calculating adversarial noise for the data sample based on the updated value of the noise parameter.

4. The method of claim 3, wherein in the updating of the value of the noise parameter, the value of the noise parameter is updated within a range that satisfies a preset size constraint condition.

5. The method of claim 3, wherein the difference between the first predicted label and the second predicted label is calculated based on Kullback-Leibler divergence.

6. The method of claim 1, wherein the noisy sample comprises a first noisy sample based on a first adversarial noise and a second noisy sample based on a second adversarial noise,
wherein the first adversarial noise and the second adversarial noise are respectively derived from noise parameters having different initial values, and
wherein the generating of the pseudo label for the data sample comprises generating the pseudo label for the data sample by aggregating a predicted label of the first noisy sample and a predicted label of the second noisy sample.

7. The method of claim 1, wherein the evaluating of the performance of the first model comprises:
predicting labels of the evaluation dataset through the first model; and
evaluating the performance of the first model by comparing the pseudo labels and the predicted labels.

8. The method of claim 1, wherein the labeled dataset is a dataset of a source domain, the evaluation dataset is a dataset of a target domain, and the method further comprising:
obtaining a third model trained using a labeled dataset of the source domain;
evaluating performance of the third model using the pseudo labels; and
selecting a model to be applied to the target domain from among the first model and the third model based on results of evaluating the performance of the first model and evaluating the performance of the third model.

9. The method of claim 1, wherein the labeled dataset is a dataset of a first source domain, the evaluation dataset is a dataset of a target domain, and the method further comprising:
obtaining a third model trained using a labeled dataset of a second source domain;
evaluating performance of the third model using the pseudo labels; and
selecting a model to be applied to the target domain from among the first model and the third model based on results of evaluating the performance of the first model and evaluating the performance of the third model.

10. The method of claim 1, wherein the evaluation dataset is a more recently generated dataset than the labeled dataset, and the method further comprising determining that the first model needs to be updated in response to a determination that the evaluated performance does not satisfy a predetermined condition.

11. A system for evaluating performance, the system comprising:
a memory configured to store one or more instructions; and
one or more processors configured to execute the one or more stored instructions to perform:
obtaining a first model trained using a labeled dataset;
obtaining a second model built by performing unsupervised domain adaptation on the first model;
generating pseudo labels for an evaluation dataset using the second model, wherein the evaluation dataset is an unlabeled dataset; and
evaluating performance of the first model using the pseudo labels,
wherein the generating of the pseudo labels comprises:
deriving adversarial noise for a data sample belonging to the evaluation dataset;
generating a noisy sample by reflecting the derived adversarial noise in the data sample; and
generating a pseudo label for the data sample based on a predicted label of the noisy sample obtained through the second model.

12. The system of claim 11, wherein the unsupervised domain adaptation and the generating of the pseudo labels are performed without using the labeled dataset.

13. A non-transitory computer-readable recording medium storing computer program executable by at least one processor to perform:
obtaining a first model trained using a labeled dataset;
obtaining a second model built by performing unsupervised domain adaptation on the first model;
generating pseudo labels for an evaluation dataset using the second model, wherein the evaluation dataset is an unlabeled dataset; and
evaluating performance of the first model using the pseudo labels,
wherein the generating of the pseudo labels comprises:
deriving adversarial noise for a data sample belonging to the evaluation dataset;
generating a noisy sample by reflecting the derived adversarial noise in the data sample; and
generating a pseudo label for the data sample based on a predicted label of the noisy sample obtained through the second model.

* * * * *